(12) United States Patent
Fujimoto et al.

(10) Patent No.: US 11,555,984 B2
(45) Date of Patent: Jan. 17, 2023

(54) MIRROR DEVICE

(71) Applicant: Yazaki Corporation, Tokyo (JP)

(72) Inventors: Yusuke Fujimoto, Shizuoka (JP); Kenji Yagi, Shizuoka (JP); Yuta Miyake, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 198 days.

(21) Appl. No.: 17/082,027

(22) Filed: Oct. 28, 2020

(65) Prior Publication Data

US 2021/0132332 A1 May 6, 2021

(30) Foreign Application Priority Data

Oct. 31, 2019 (JP) .............................. JP2019-198794

(51) Int. Cl.
*G02B 27/01* (2006.01)
*G02B 7/182* (2021.01)
*B60K 35/00* (2006.01)

(52) U.S. Cl.
CPC ............ *G02B 7/1821* (2013.01); *B60K 35/00* (2013.01); *G02B 27/0101* (2013.01); *B60K 2370/1529* (2019.05); *B60K 2370/23* (2019.05)

(58) Field of Classification Search
CPC .. G02B 27/0149; G02B 7/1821; G02B 7/182; B60K 35/00; B60K 2370/1529; F16C 27/02
See application file for complete search history.

(56) References Cited

U.S. PATENT DOCUMENTS

2015/0286054 A1   10/2015   Ushida et al.

FOREIGN PATENT DOCUMENTS

| FR | 2714126 A1 | 6/1995 |
|----|------------|--------|
| FR | 3023926 A1 | 1/2016 |
| JP | 2012-35736 A | 2/2012 |
| JP | 2014-85539 A | 5/2014 |

*Primary Examiner* — Ryan D Howard
(74) *Attorney, Agent, or Firm* — Kenealy Vaidya LLP

(57) ABSTRACT

A mirror device includes: a mirror having a rotation shaft and a reflecting surface that reflects display light; a support portion having a cylindrical shape, having a base end fixed and a tip end being a free end, and configured to rotatably support the rotation shaft; and a motor that pivots the mirror, in which the rotation shaft is inserted into the support portion while spreading the support portion outward in a radial direction, and is slidably supported by the support portion.

18 Claims, 28 Drawing Sheets

MIRROR DEVICE

CROSS-REFERENCE TO RELATED APPLICATION(S)

The present application claims priority to and incorporates by reference the entire contents of Japanese Patent Application No. 2019-198794 filed in Japan. on Oct. 31, 2019.

BACKGROUND OF THE INVENTION

1. Field of the Invention

The present invention relates to a mirror device.

2. Description of the Related Art

There is a conventionally used mirror device. Japanese Patent Application Laid-open No. 2014-85539 discloses a head-up display device in which display light representing a predetermined image emitted from a display is reflected by a reflector so as to enable an image to be visually recognized by the display light reflected by the reflector. The head-up display device of Japanese Patent Application Laid-open No. 2014-85539 includes an elastic member that presses a supported portion and a supporting portion against each other in the rotation axis direction. The head-up display device of Japanese Patent Application Laid-open No. 2014-85539 is designed to reduce blurring of a display image due to applied vibration.

There is still room for improvement in appropriately holding the rotation shaft of the mirror. For example, occurrence of displacement of the rotation shaft in a direction orthogonal to the axis or vibration of the rotation shaft might cause quality degradation in the display image.

SUMMARY OF THE INVENTION

An object of the present invention is to provide a mirror device capable of appropriately holding a rotation shaft.

A mirror device according to one aspect of the present invention includes a mirror having a rotation shaft and a reflecting surface that reflects display light; a support portion having a cylindrical shape, having a base end fixed and a tip end being a free end, and configured to rotatably support the rotation shaft; and a motor that pivots the mirror, wherein the rotation shaft is inserted into the support portion while spreading the support portion outward in a radial direction, and is slidably supported by the support portion.

According to another aspect of the present invention, the mirror device may further include a holding member having a motor holder that holds the motor, wherein the support portion is a part of the holding member and is formed integrally with the motor holder.

According to still another aspect of the present invention, in the mirror device, it is preferable that both ends of the rotation shaft are supported by the support portion.

According to still another aspect of the present invention, in the mirror device, it is preferable that the support portion has a tapered shape in which an inner diameter at the tip end is smaller than an inner diameter at the base end.

According to still another aspect of the present invention, in the mirror device, it is preferable that the support portion has a C-shaped cross-sectional shape in a cross section orthogonal to an axial direction.

According to still another aspect of the present invention, in the mirror device, it is preferable that the support portion has a plurality of pieces each having an arc-shaped cross section, and the plurality of pieces is separated from each other by a slit extending from the tip end to the base end of the support portion.

A mirror device according to still another aspect of the present invention includes a mirror having a rotation shaft and a reflecting surface that reflects display light; a motor that pivots the mirror; and a holding member provided with a support portion having a cylindrical shape, having a base end fixed and a tip end being a free end, and configured to rotatably support the rotation shaft, and provided with a motor holder that holds the motor, the support portion and the motor holder being integrally formed in the holding member, wherein the rotation shaft is inserted into the support portion while spreading the support portion outward in a radial direction, and is slidably supported by the support portion, and the support portion has a C-shaped cross-sectional shape in a cross section orthogonal to an axial direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a mirror device according to an embodiment of the present invention will be described in detail with reference to the drawings. Note that the present invention is not limited by this embodiment. Moreover, components in the following embodiment include those that are easily conceivable for those skilled in the art or substantially identical.

Embodiment

Figure 1:
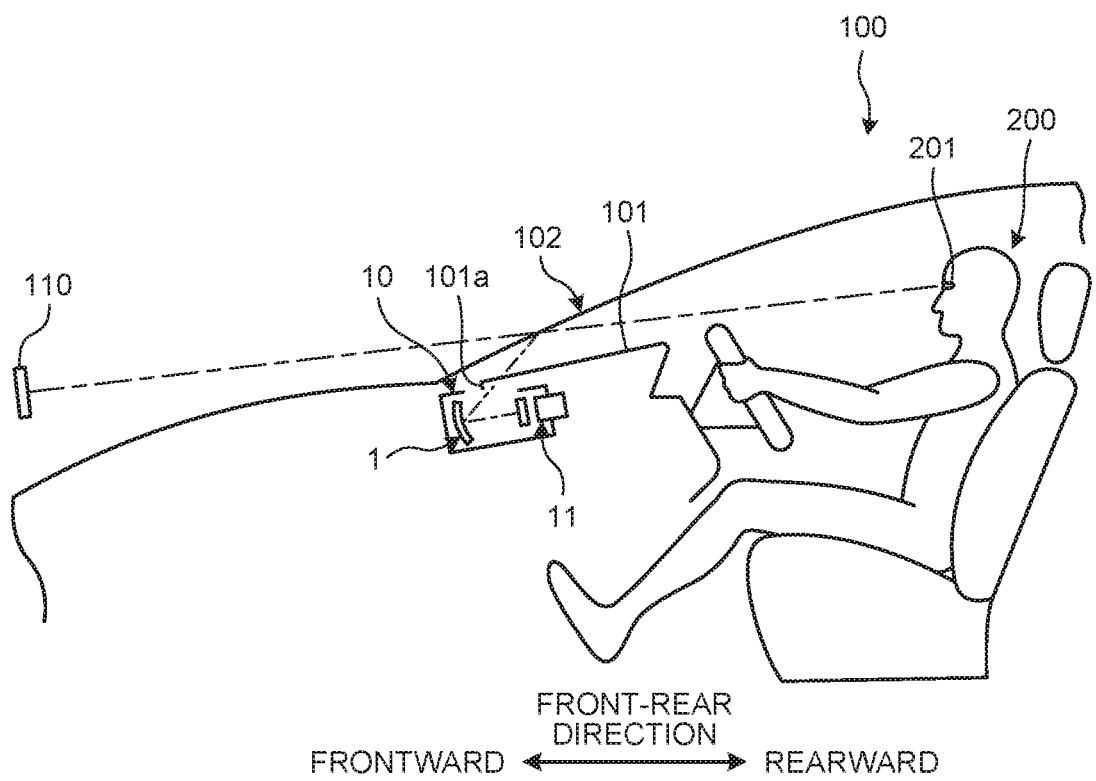
FIG. 1 is a diagram illustrating a schematic configuration of a vehicle display device according to an embodiment.
Figure 2:
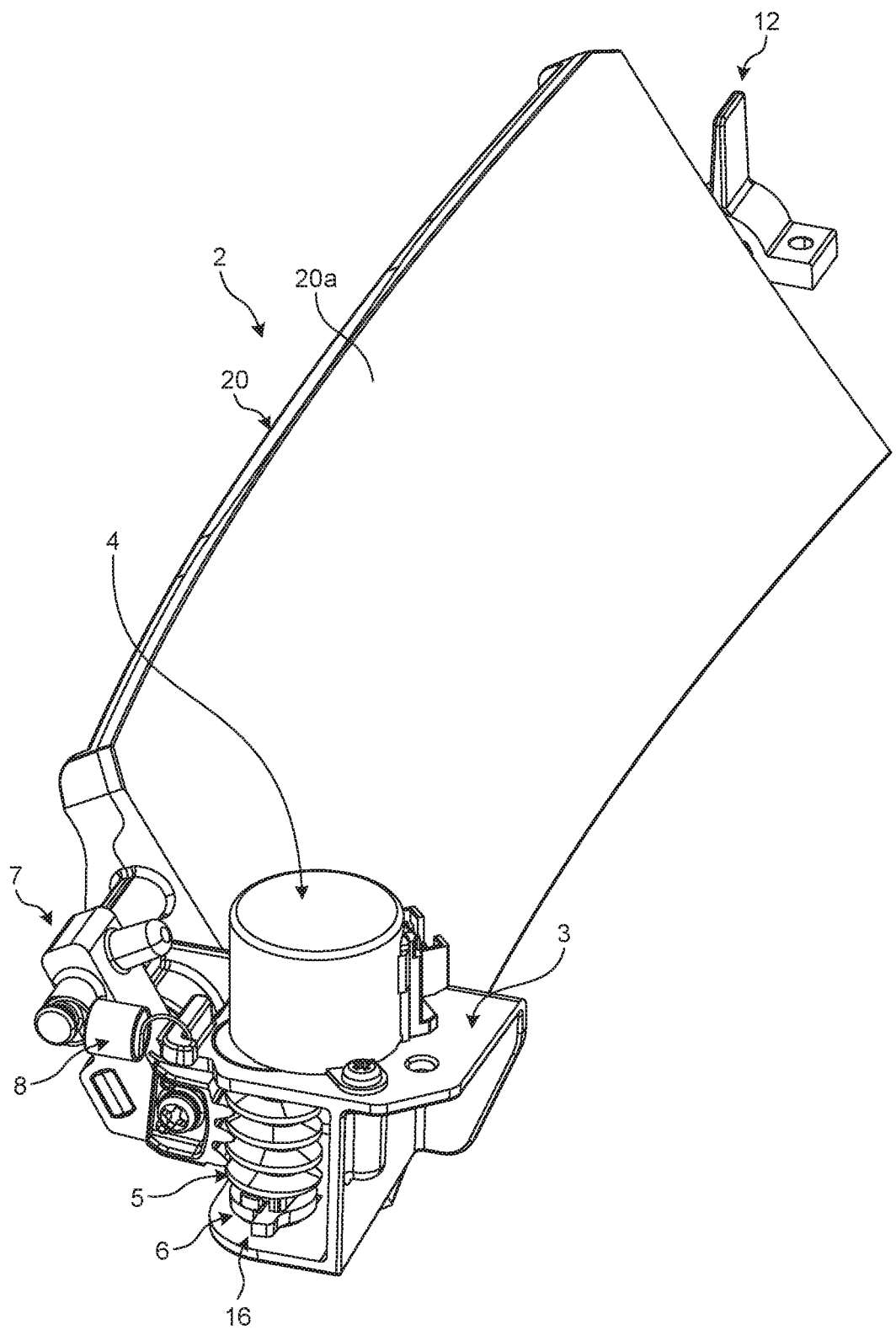
FIG. 2 is a perspective view of a mirror device according to an embodiment.
Figure 3:
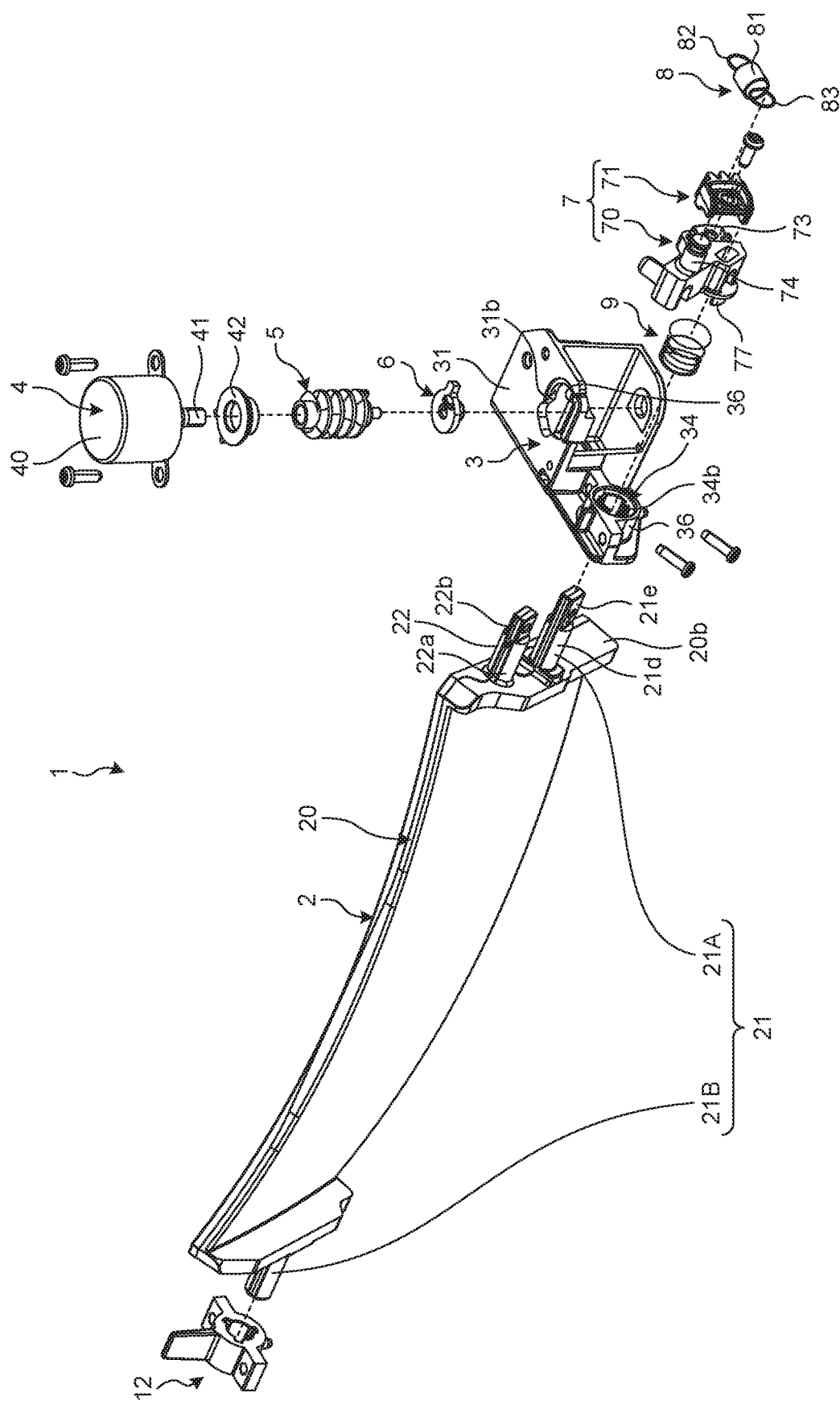
FIG. 3 is an exploded perspective view of a mirror device according to an embodiment.
Figure 4:
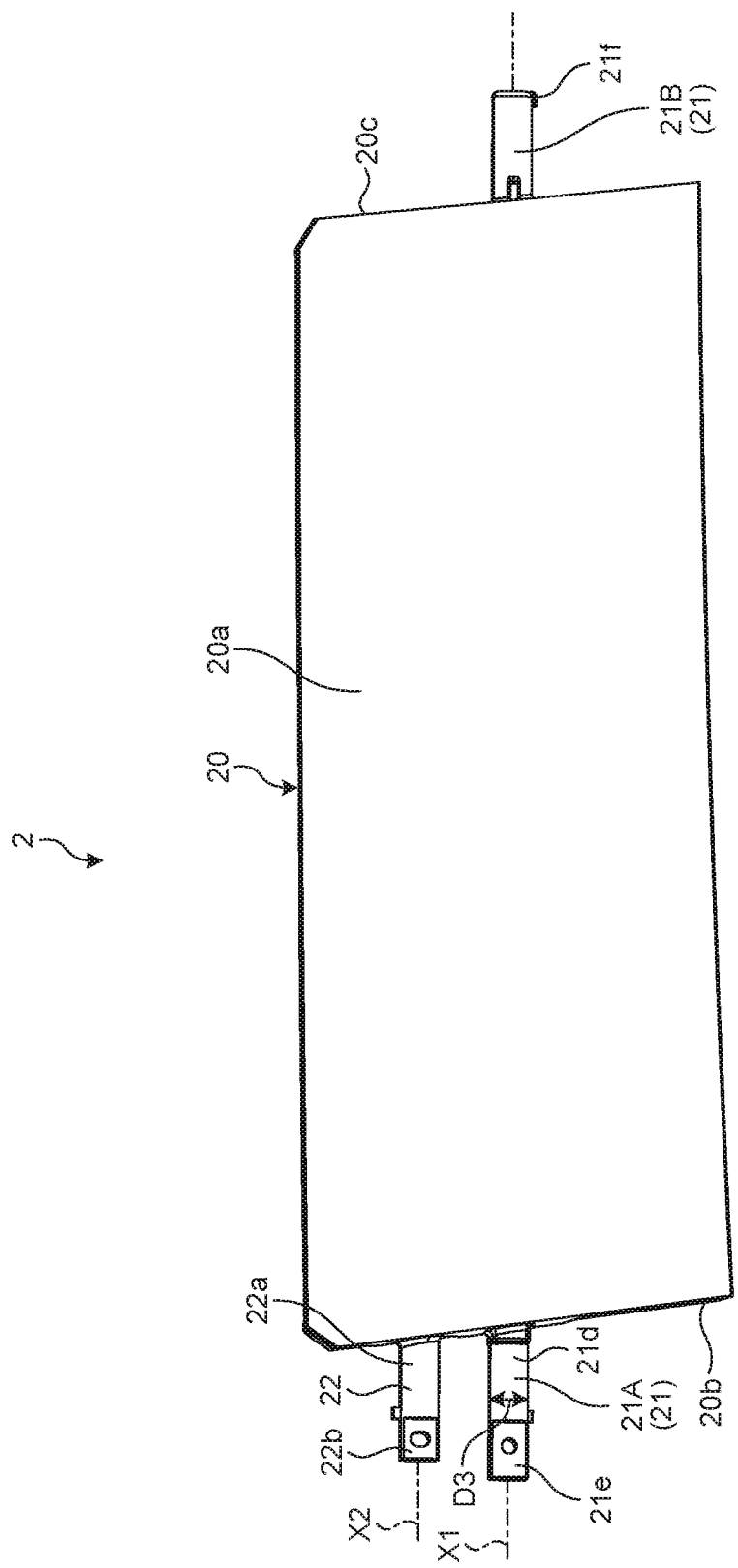
FIG. 4 is a front view of a mirror device according to an embodiment.
Figure 5:
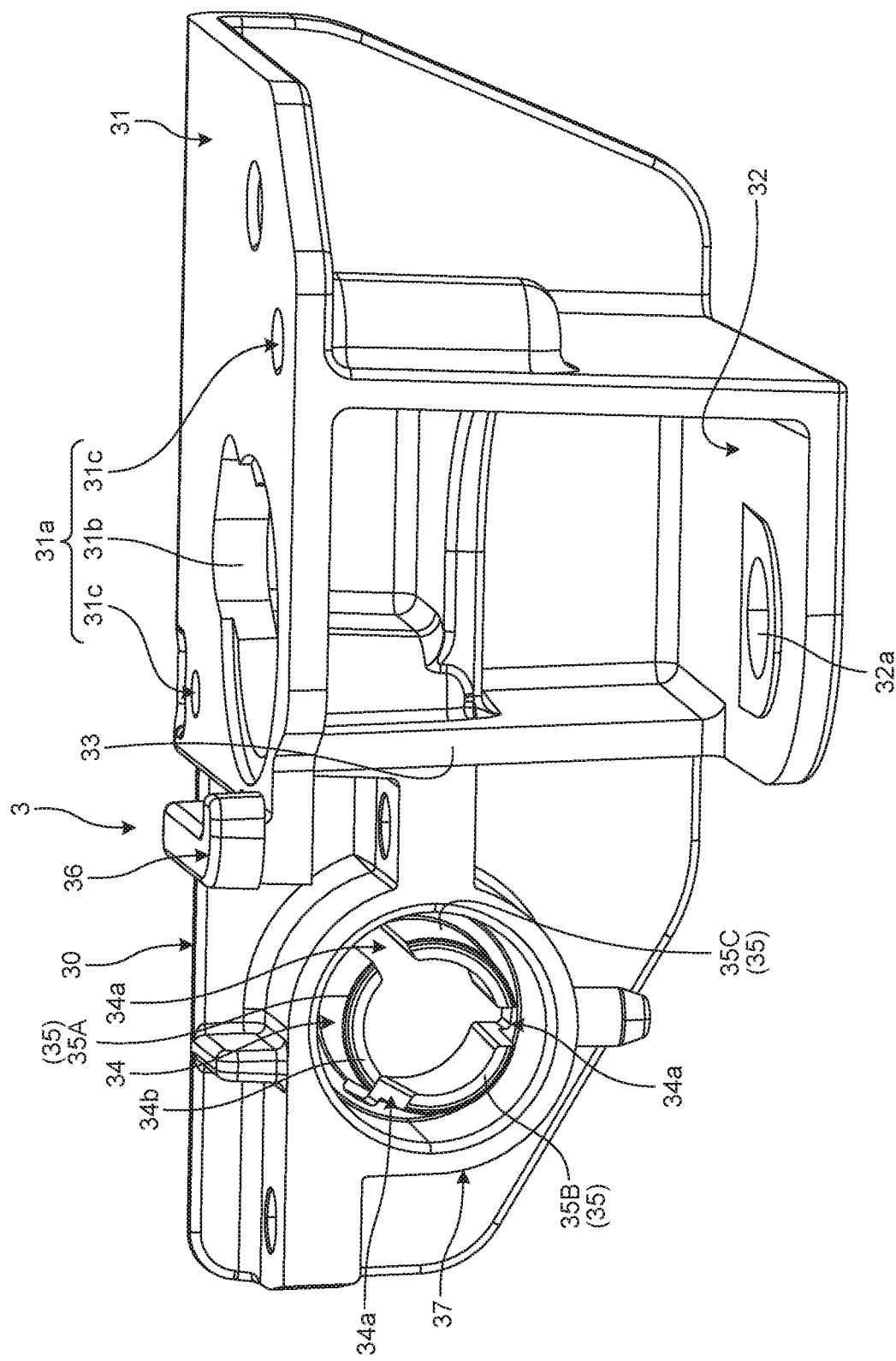
FIG. 5 is a perspective view of holding member according to an embodiment.
Figure 6:
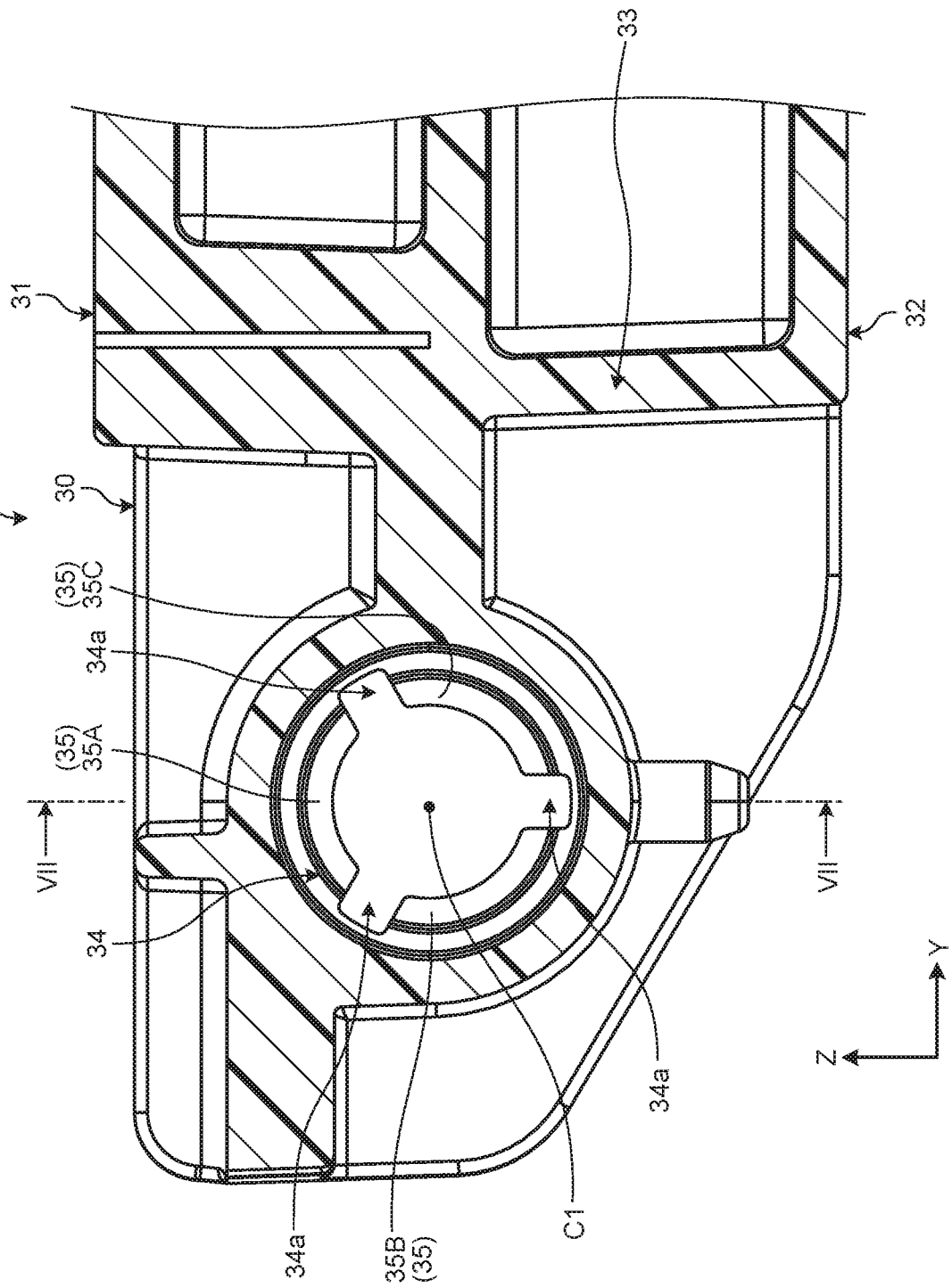
FIG. 6 is a cross-sectional view of a holding member according to an embodiment.
Figure 7:
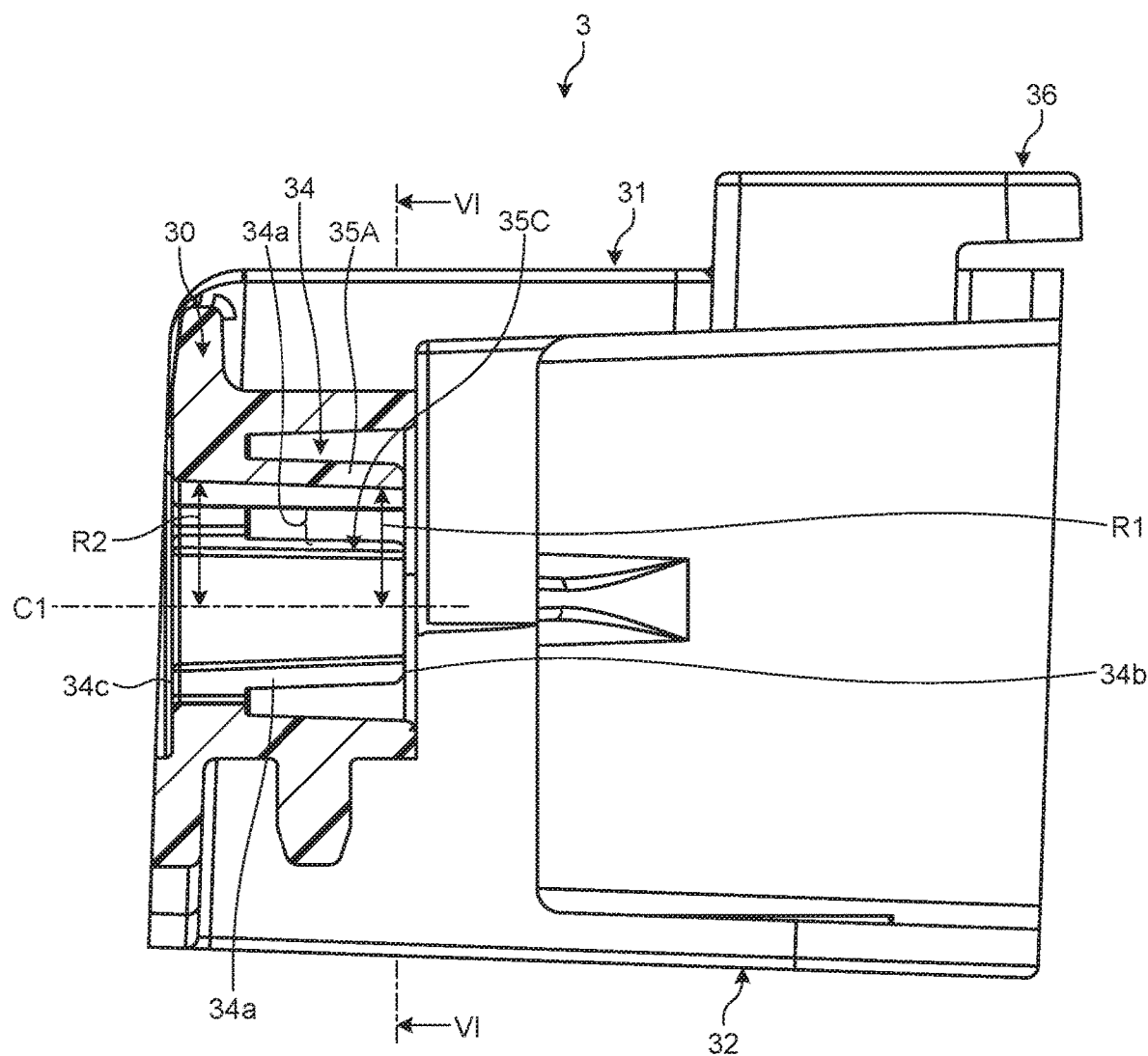
FIG. 7 is a cross-sectional view of a holding member according to an embodiment.
Figure 8:
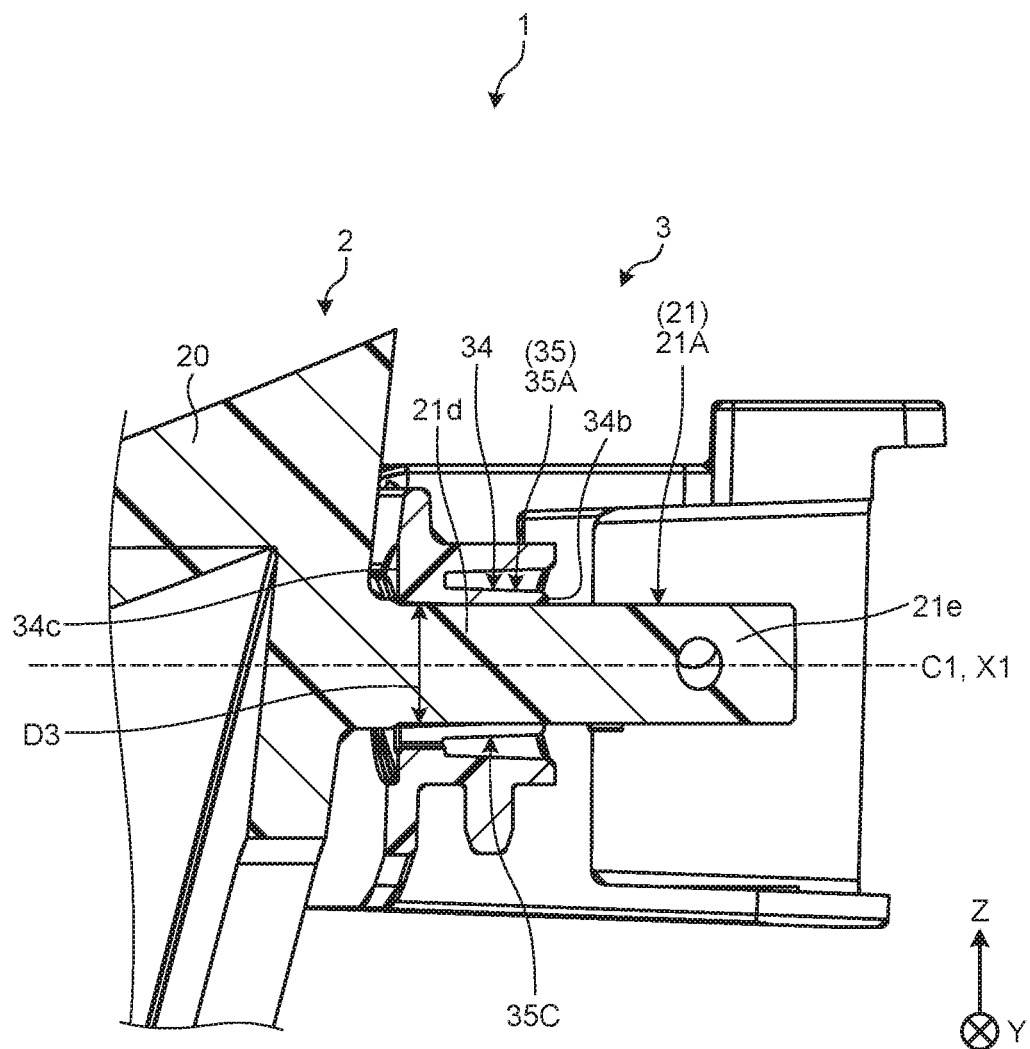
FIG. 8 is a cross-sectional view illustrating a rotation shaft held by a support portion of a holding member.
Figure 9:
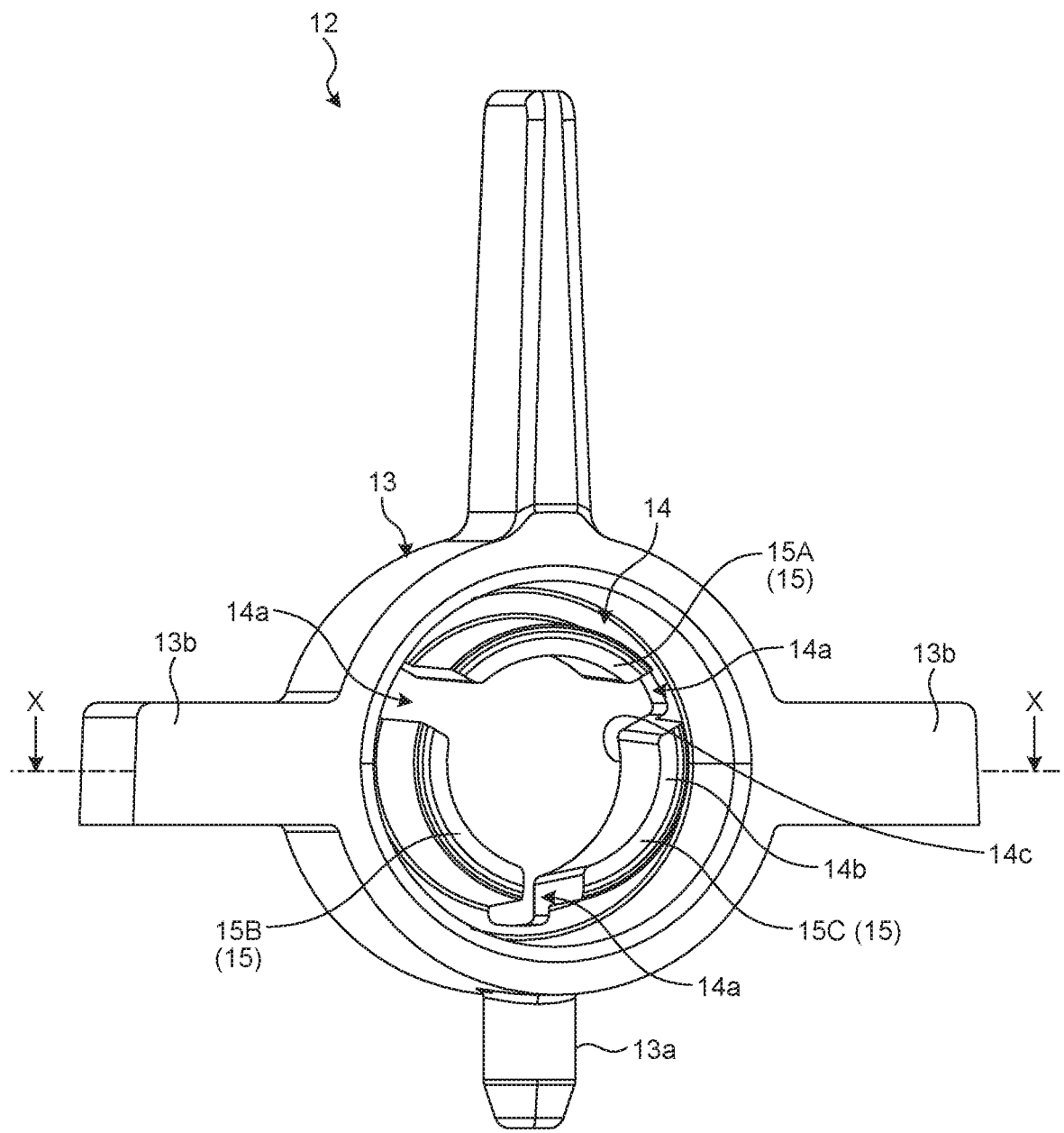
FIG. 9 is a perspective view of a bearing member according to an embodiment.
Figure 10:
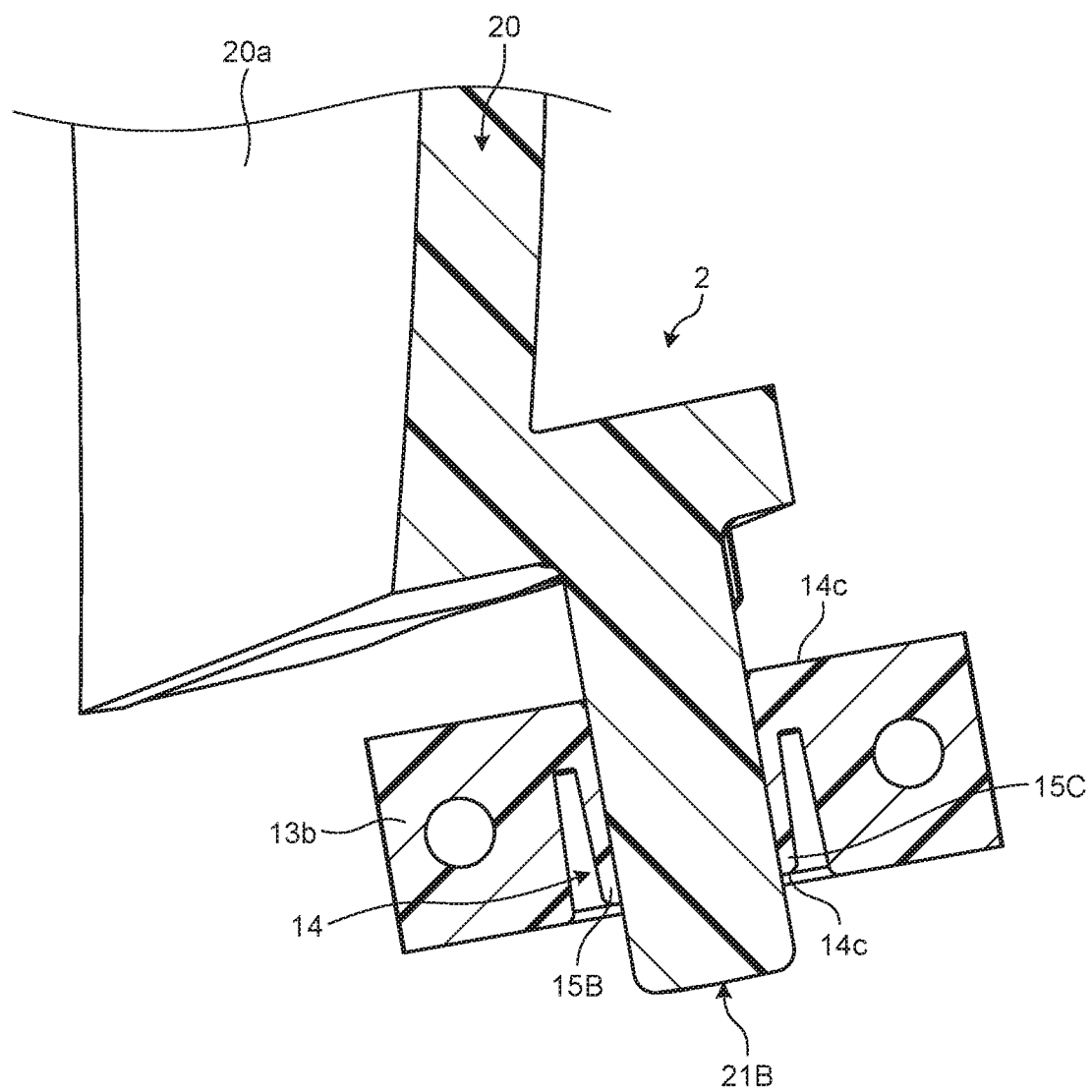
FIG. 10 is a cross-sectional view illustrating a rotation shaft held by a support portion of a bearing member.

An embodiment will be described with reference to FIGS. 1 to 25. The present embodiment relates to a mirror device. FIG. 1 is a schematic configuration diagram of a vehicle display device according to an embodiment. FIG. 2 is a perspective view of a mirror device according to an embodiment. FIG. 3 is an exploded perspective view of mirror device according to an embodiment. FIG. 4 is a front view of a mirror according to an embodiment. FIG. 5 is a perspective view of a holding member according to an embodiment. FIG. 6 is a cross-sectional view of a holding member according to an embodiment. FIG. 7 is a cross-sectional view of a holding member according to an embodiment. FIG. 8 is a cross-sectional view of a rotation shaft held by a support portion of a holding member. FIG. 9 is a perspective view of a bearing member according to an embodiment. FIG. 10 is a cross-sectional view of a rotation shaft held by a support portion of a bearing member.

Figure 11:
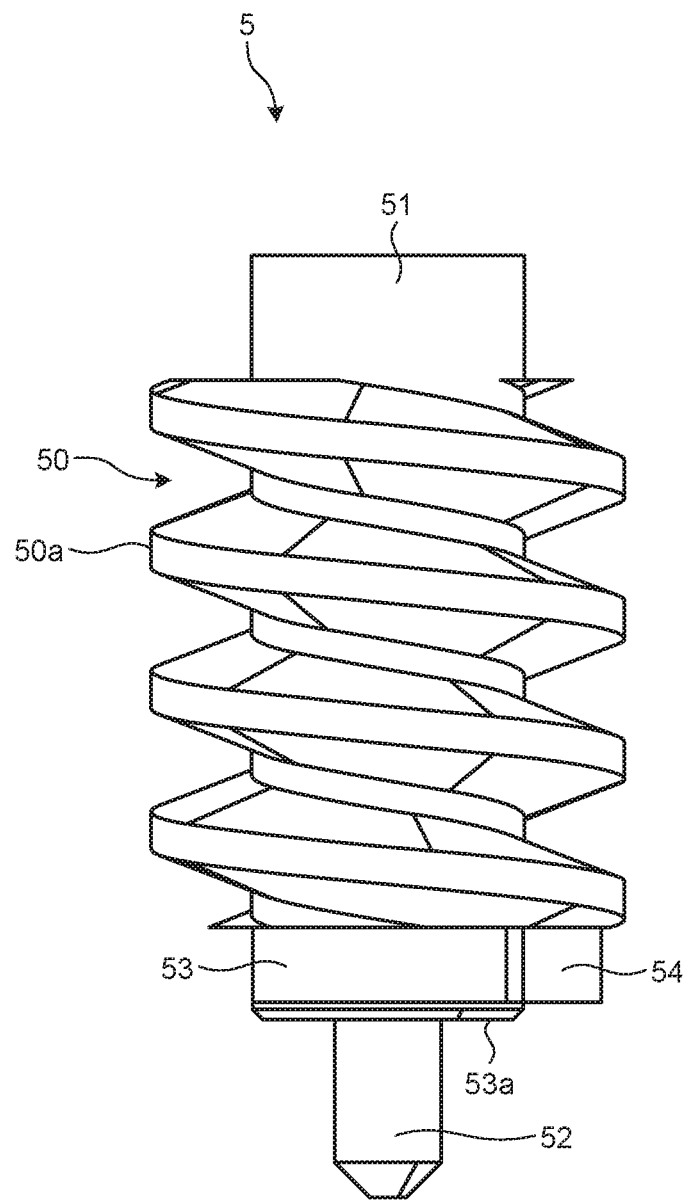
FIG. 11 is a front view of a worm according to an embodiment.
Figure 12:
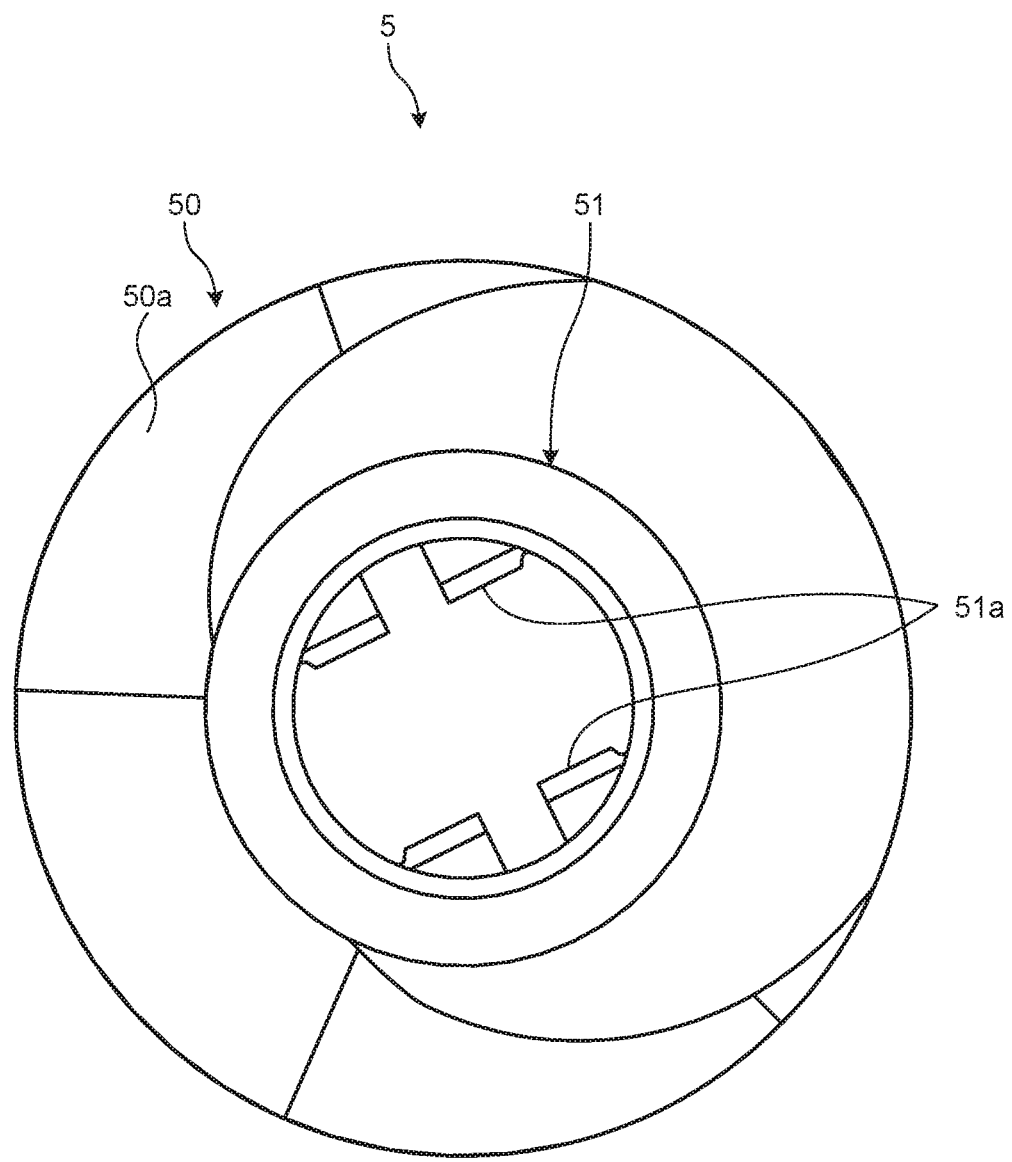
FIG. 12 is a view of a worm according to an embodiment as viewed in as axial direction from the motor side.
Figure 13:
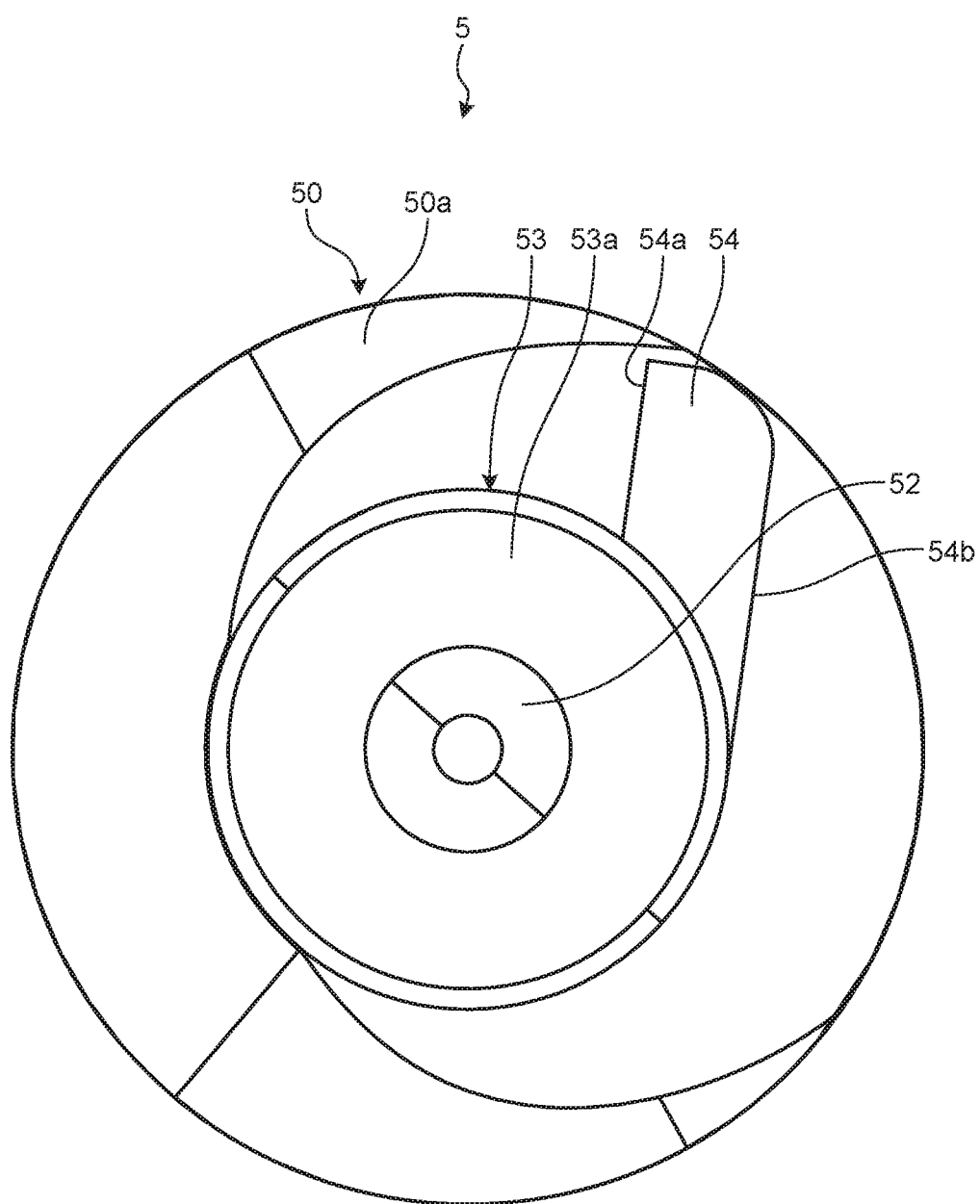
FIG. 13 is a view of a worm according to an embodiment as viewed in an axial direction from the rotating member side.
Figure 14:
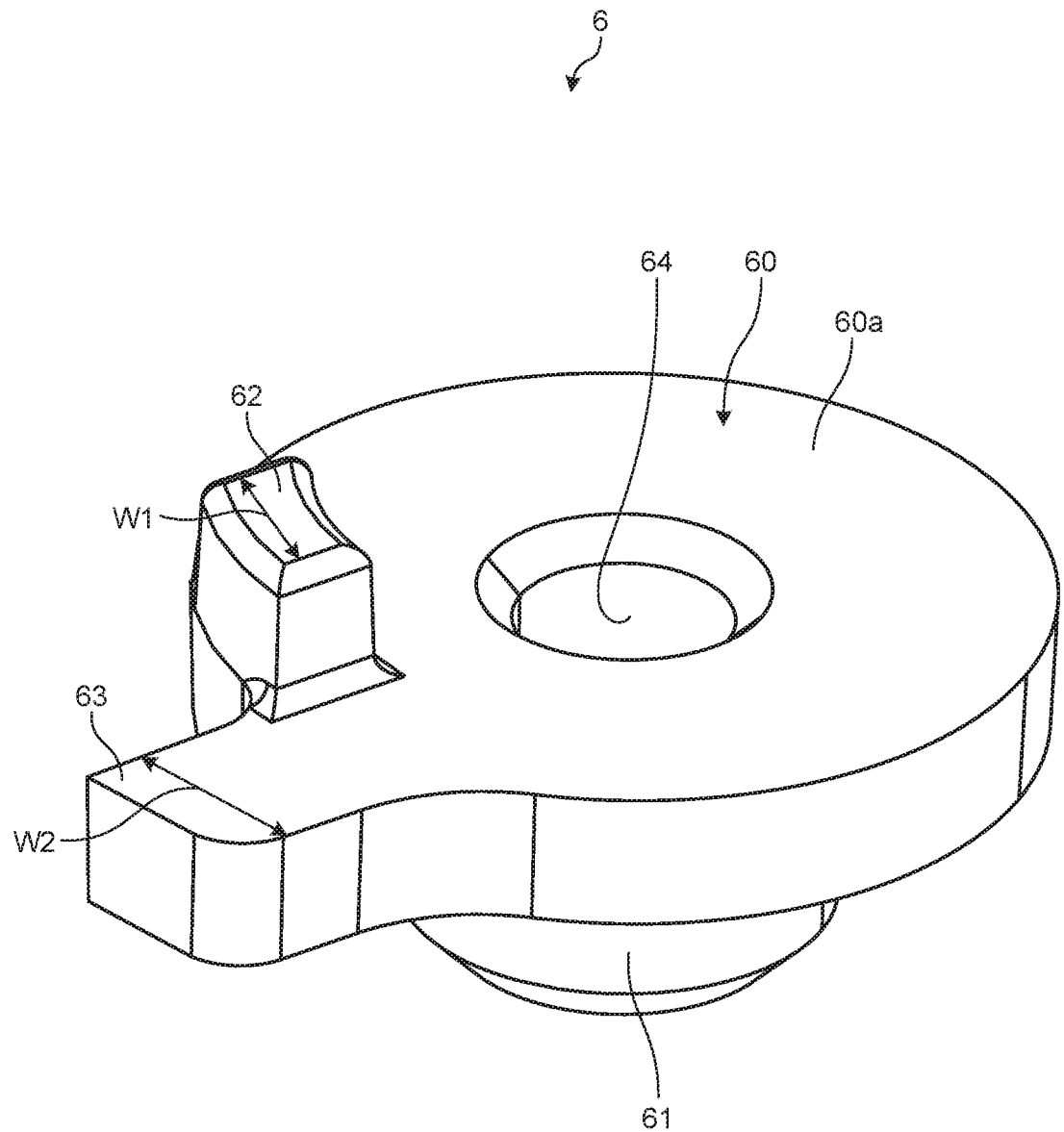
FIG. 14 is a perspective view of a rotating member according to an embodiment.
Figure 15:
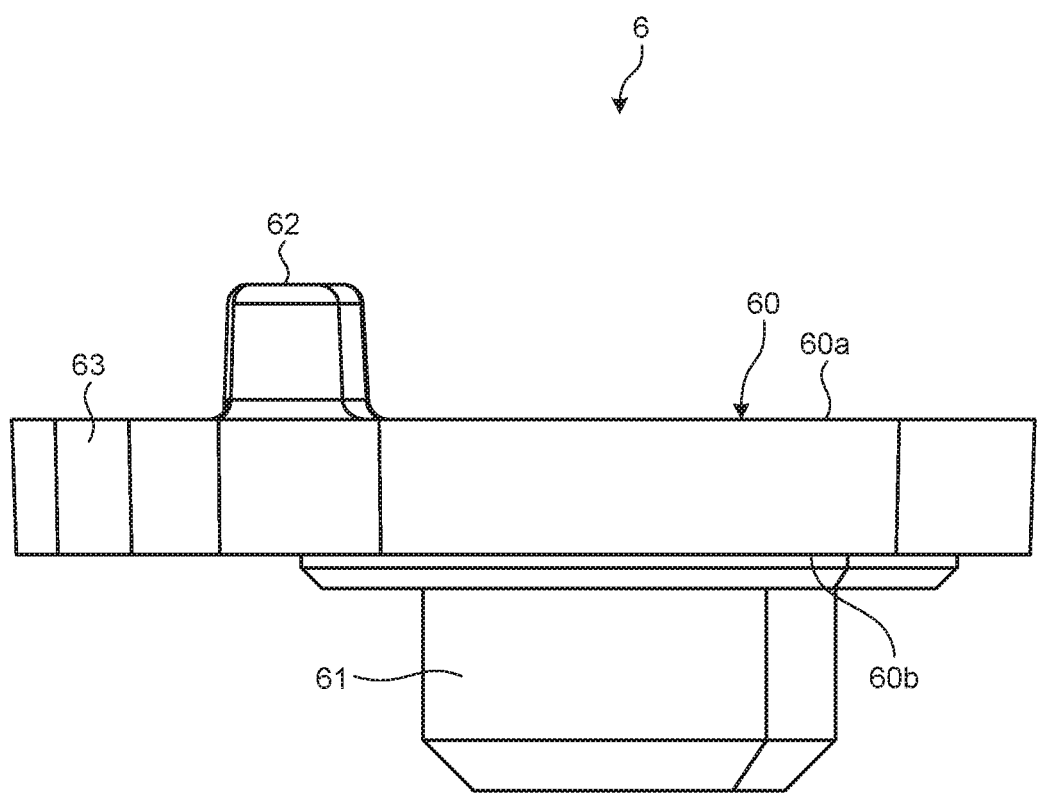
FIG. 15 is a front view of a rotating member according to an embodiment.
Figure 16:
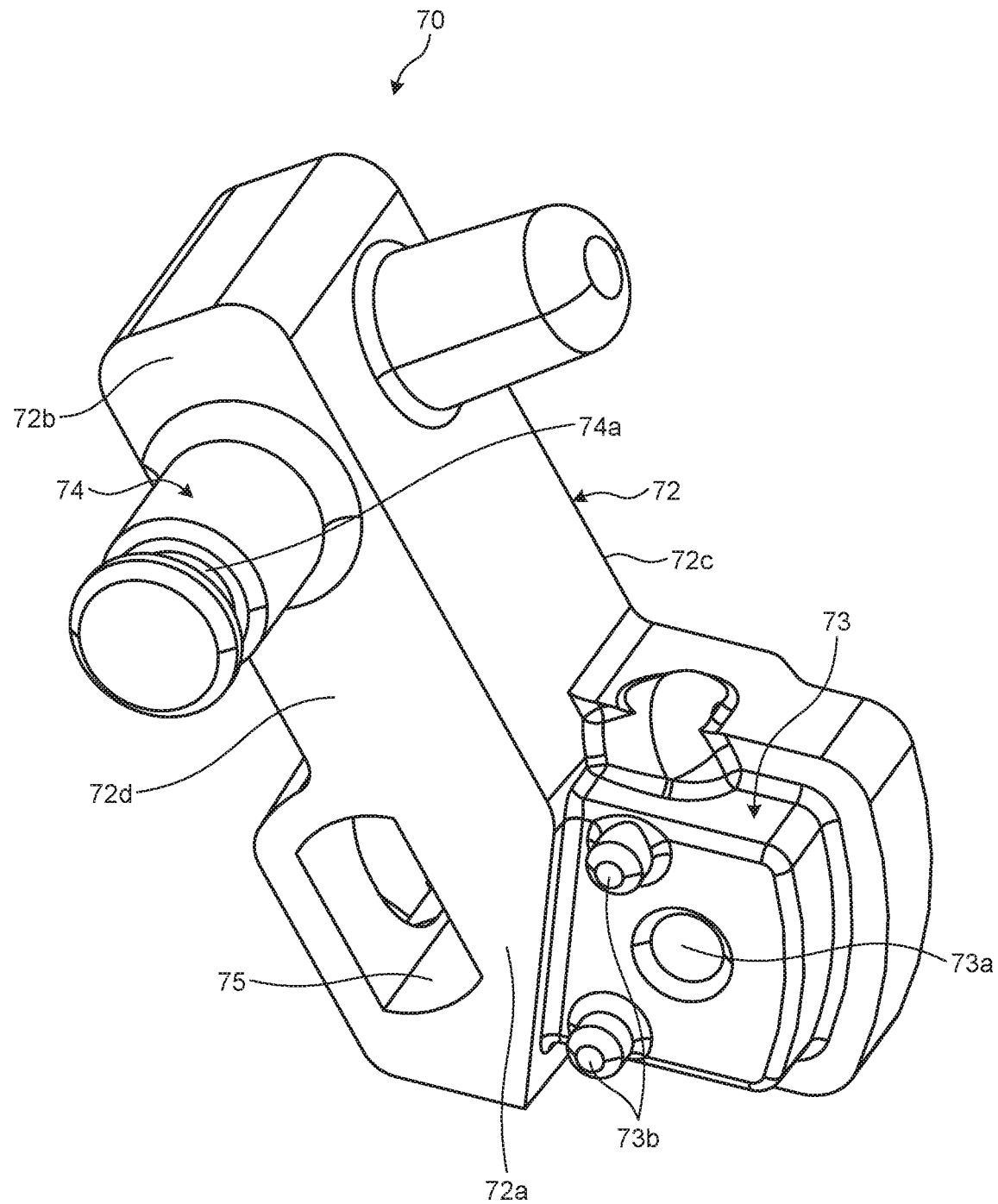
FIG. 16 is a perspective view of a main body of a coupling member according to an embodiment.
Figure 17:
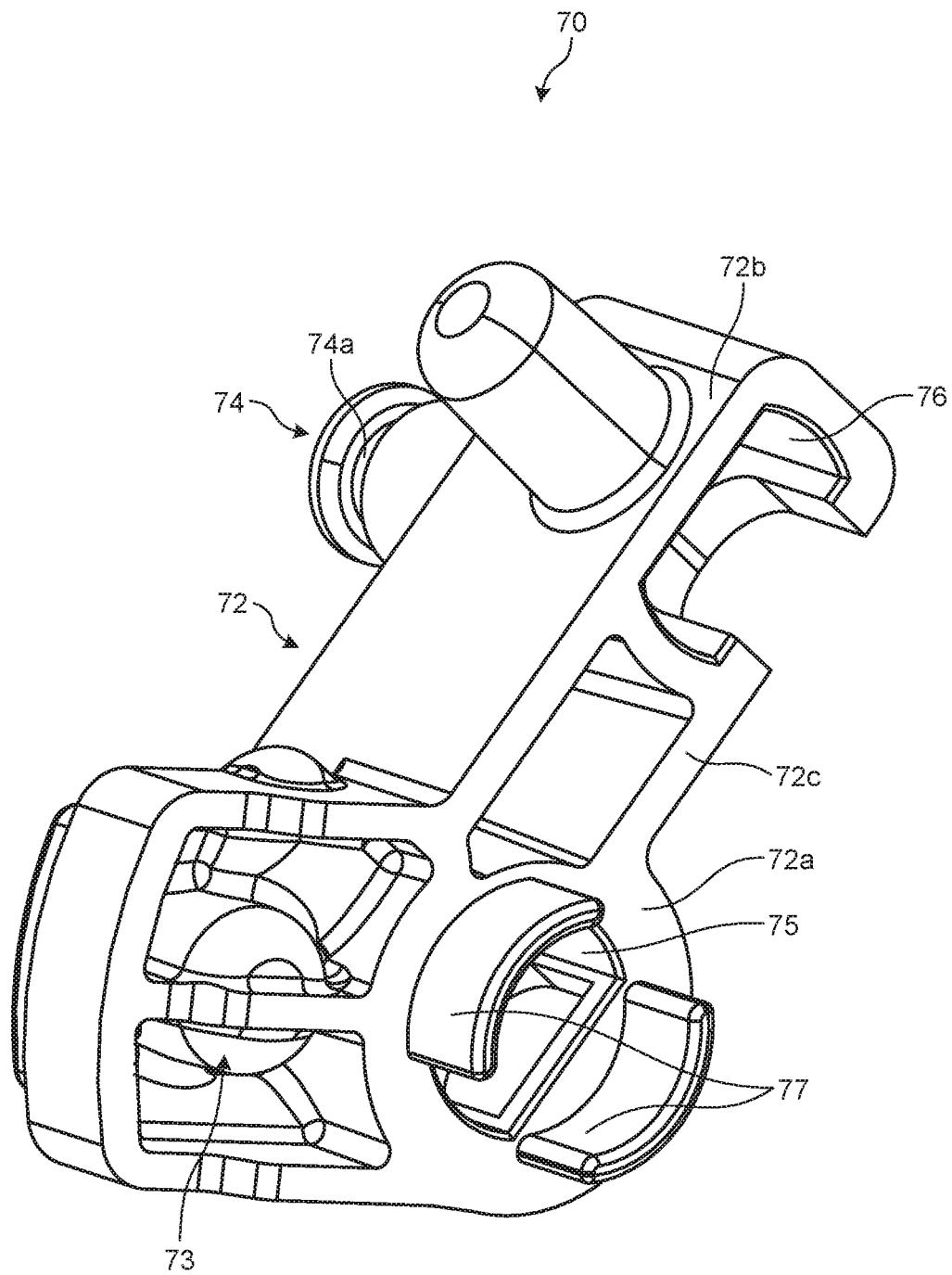
FIG. 17 is a perspective view of a main body of a coupling member according to an embodiment.
Figure 18:
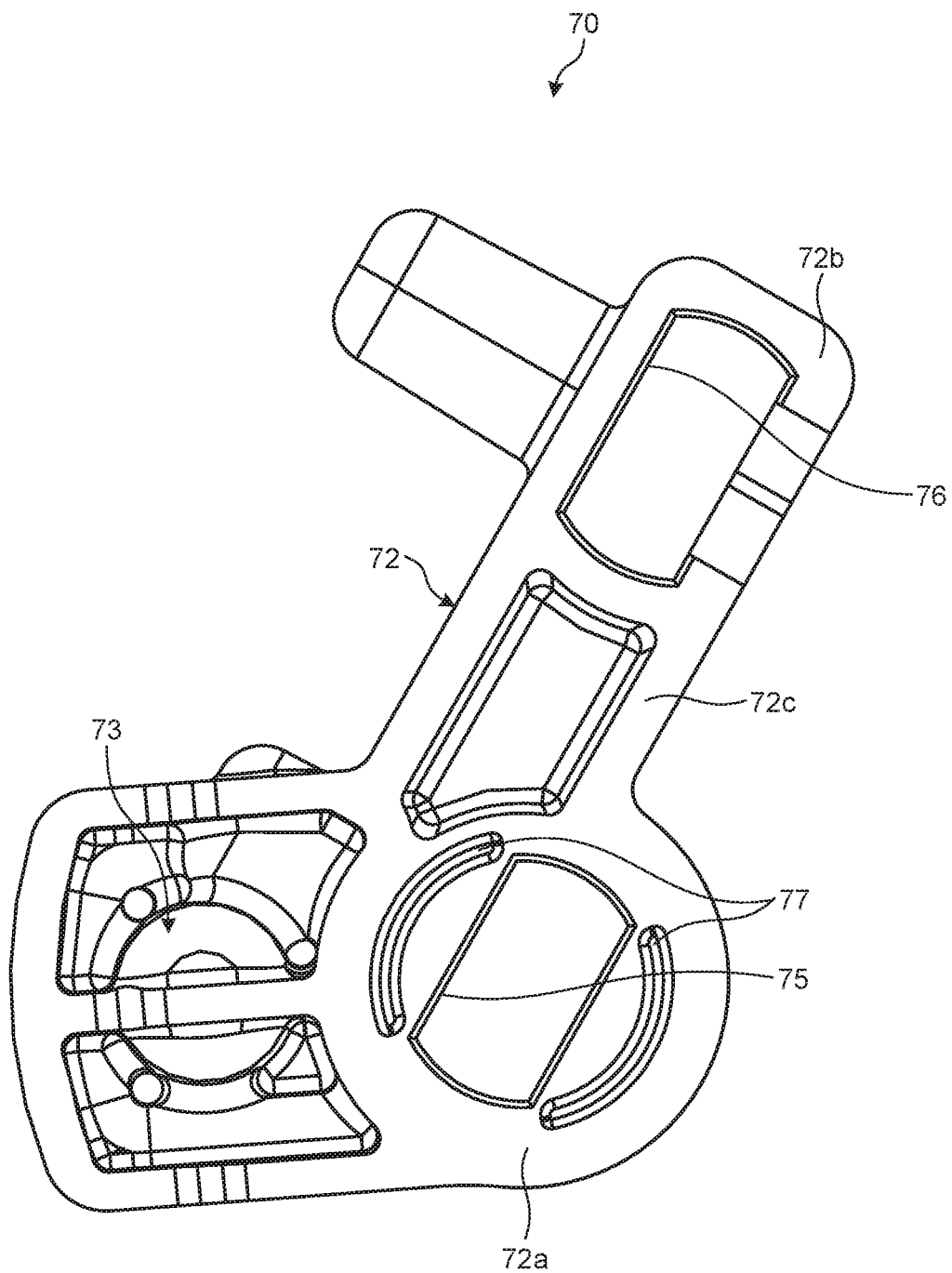
FIG. 18 is a side view of a main body of a coupling member according to an embodiment.
Figure 19:
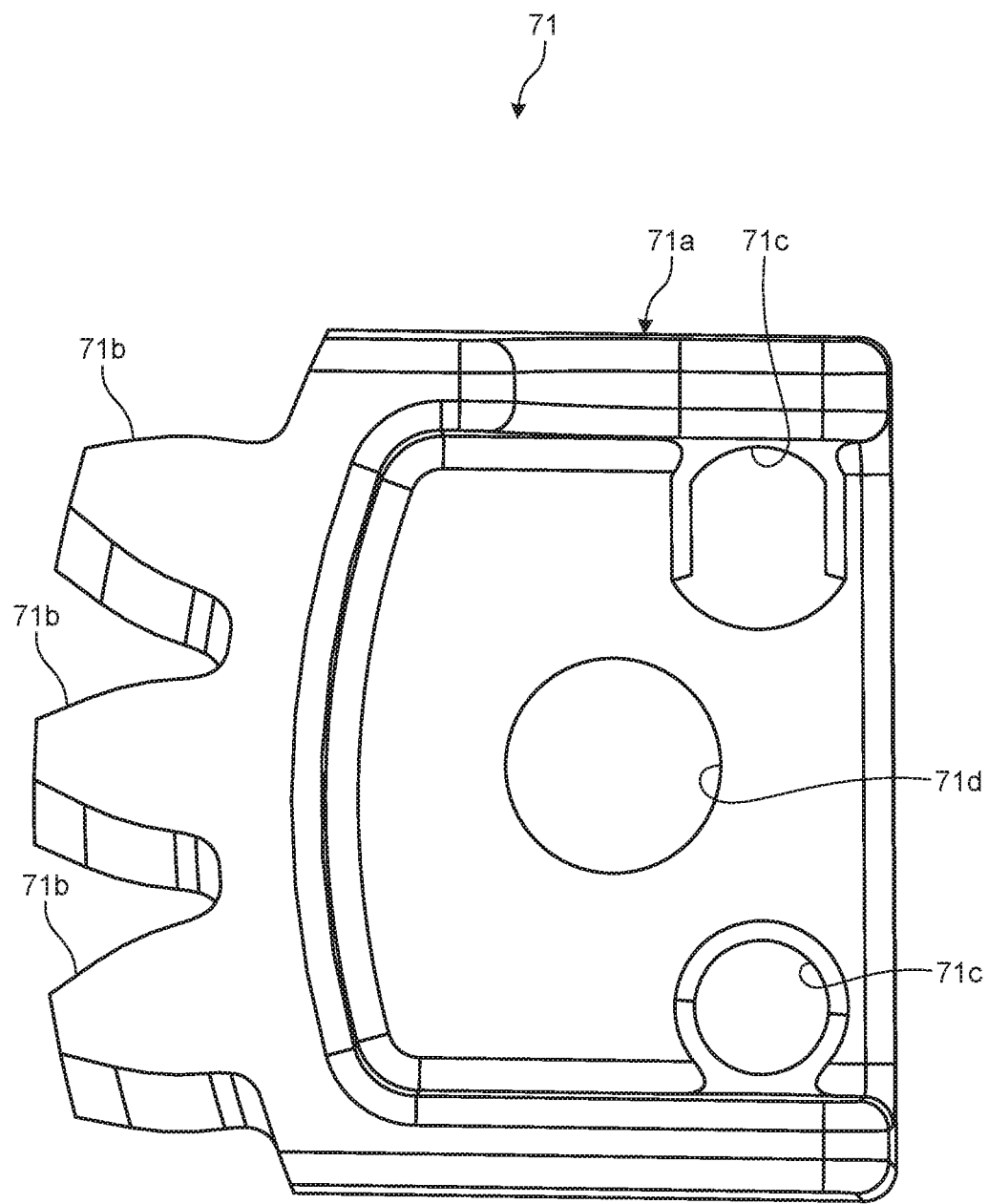
FIG. 19 is a front view of a gear unit of a coupling member according to an embodiment.
Figure 20:
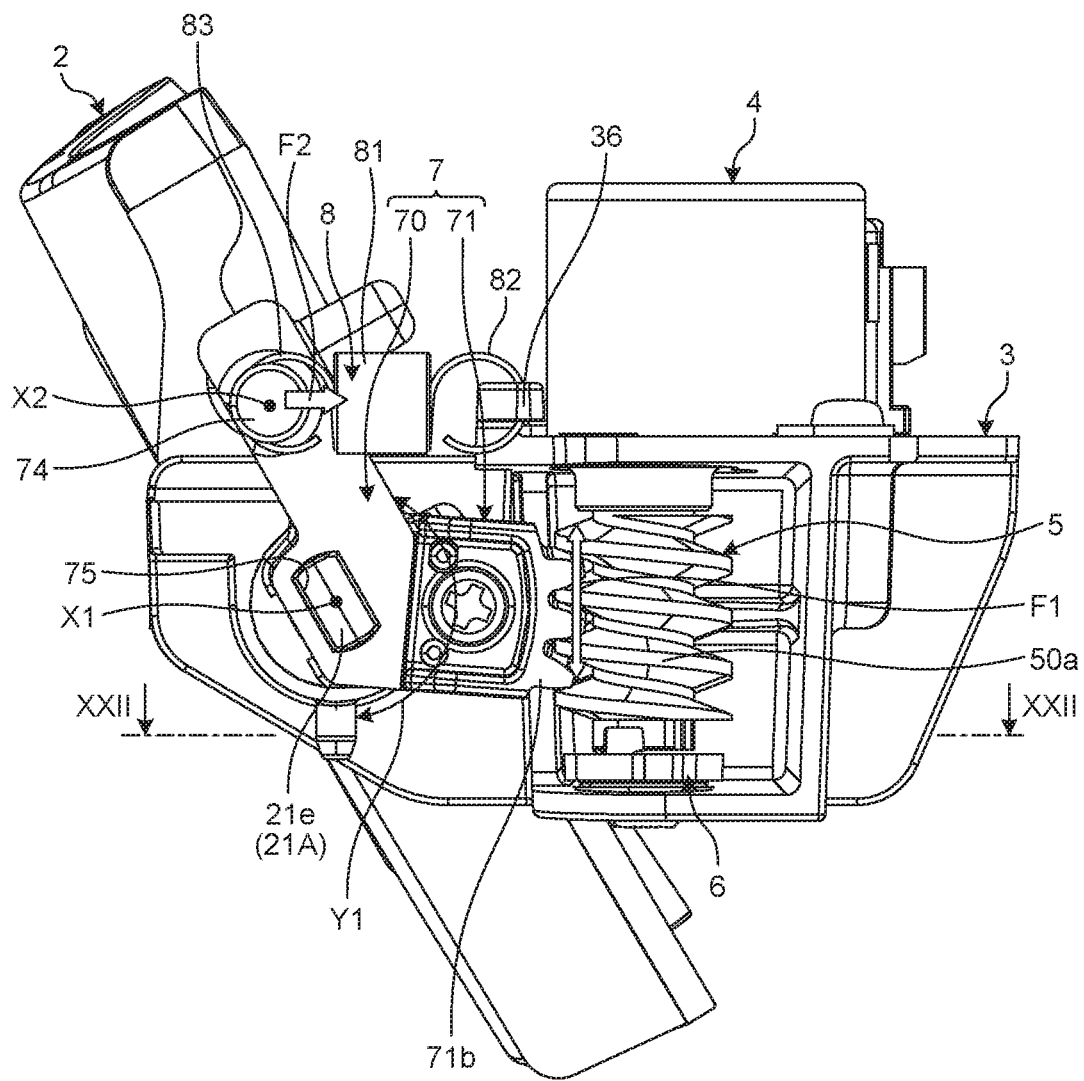
FIG. 20 is a view of a mirror device according to an embodiment as viewed along a first axis.

FIG. 11 is a front view of a worm according to an embodiment. FIG. 12 is a view of a worm according to an embodiment as viewed in an axial direction from the motor side. FIG. 13 is a view of a worm according to an embodiment as viewed in an axial direction from the rotating member side. FIG. 14 is a perspective view of a rotating member according to an embodiment. FIG. 15 is a front view of a rotating member according to an embodiment. FIG. 16 is a perspective view of a main body of a coupling member according to an embodiment. FIG. 17 is a perspective view of the main body of a coupling member according to an embodiment. FIG. 18 is a side view of a main body of a coupling member according to an embodiment. FIG. 19 is a front view of a gear unit of a coupling member according to an embodiment. FIG. 20 is a view of a mirror device according to an embodiment as viewed along a first axis.

Figure 21:
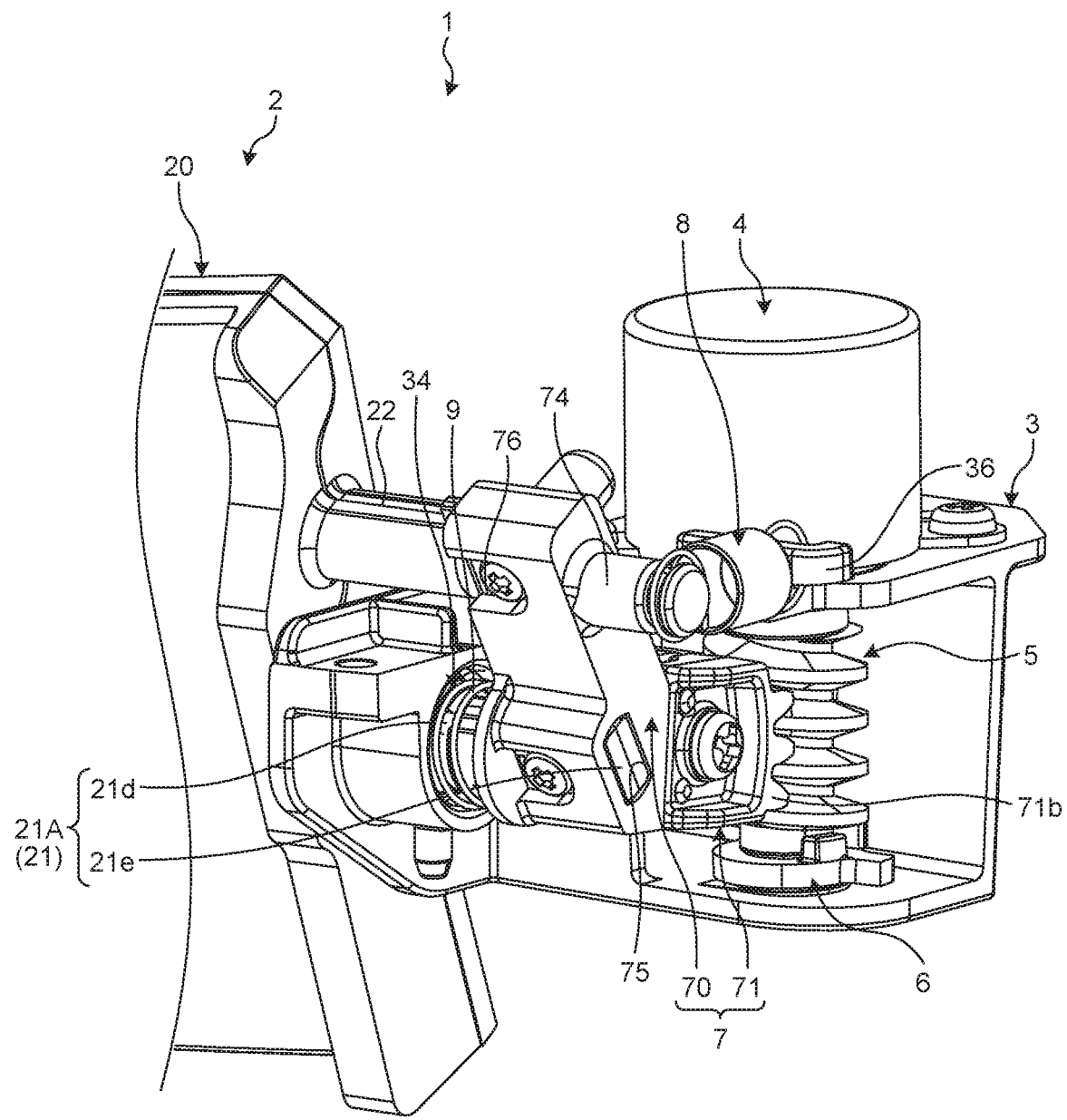
FIG. 21 is a perspective view of a mirror device according to an embodiment.

FIG. 21 is a perspective view of a mirror device according to an embodiment. FIGS. 22 to 25 are cross-sectional views of a stopper mechanism according to an embodiment. FIG. 6 illustrates a cross-sectional view taken along line VI-VI in FIG. 7. FIGS. 7 and 8 are cross-sectional views taken along line VII-VII in FIG. 6. FIG. 10 illustrates a cross section taken along line X-X in FIG. 9. FIGS. 22 to 25 are cross-sectional views taken along line XXII-XXII in FIG. 20.

As illustrated in FIG. 1, a vehicle display device 10 according to an embodiment is also referred to as a head-up display device. The vehicle display device 10 displays a virtual image 110 in front of an eyepoint 201 of a vehicle 100. The eyepoint 201 is a predetermined position as a viewpoint position of a driver 200 seated in a driver's seat.

The vehicle display device 10 is disposed inside a dashboard 101 of the vehicle 100. There is an opening 101a provided on an upper surface of the dashboard 101. The vehicle display device 10 projects an image onto a windshield 102 through the opening 101a. The windshield 102 is a reflector located in front of the eyepoint 201 of the vehicle 100. The windshield 102 has translucency, for example, and reflects the light incident from the vehicle display device 10 toward the eyepoint 201. The driver 200 recognizes the image reflected by the windshield 102 as the virtual image 110. For the driver 200, the virtual image 110 is recognized as being present ahead of the windshield 102.

The vehicle display device 10 includes a mirror device 1 and an image display device 11. The image display device 11 is a device that outputs display light, represented by a laser scanner or a liquid crystal display device, for example. The mirror device 1 reflects the display light output from the image display device 11 toward the windshield 102. The mirror device 1 of the present embodiment is a movable mirror device that can change the direction of the reflecting surface.

As illustrated in FIGS. 2 and 3, the mirror device 1 includes a mirror 2, a holding member 3, a motor 4, a worm 5, a rotating member 6, a coupling member 7, a first spring 8, a second spring 9, and a bearing member 12.

The mirror 2 includes a mirror body 20, a rotation shaft 21, and a coupling shaft 22. The mirror body 20, the rotation shaft 21, and the coupling shaft 22 are integrally molded with synthetic resin, for example. The mirror body 20 has a reflecting surface 20a. The reflecting surface 20a is a recessed curved surface and expands the display light output from the image display device 11 to be reflected toward the windshield 102. The shape of the reflecting surface 20a of the present embodiment is a freeform surface. The reflecting surface 20a may have a reflective layer formed by vapor deposition or the like.

As illustrated in FIGS. 3 and 4, the rotation shaft 21 has a first shaft portion 21A and a second shaft portion 21B. The first shaft portion 21A and the second shaft portion 21B are arranged at the position of a first axis X1. The first axis X1 is a rotation center of the mirror 2. The central axes of the first shaft portion 21A and the second shaft portion 21B are individually located on the first axis X1. The first shaft portion 21A protrudes from a first side surface 20b of the mirror body 20 along the first axis X1. The second shaft portion 21B protrudes from a second side surface 20c of the mirror body 20 along the first axis X1.

The first shaft portion 21A has a base end portion 21d and a tip end portion 21e. The base end portion 21d is a base end side part of the first shaft portion 21A and is connected to the first side surface 20b. The base end portion 21d has a columnar shape. The tip end portion 21e protrudes from a tip end surface of the base end portion 21*d* along the first axis X1. The tip end portion 21*e* has a flat plate shape having a substantially rectangular cross section. The tip end portion 21*e* has a through hole to which a screw is inserted. The second shaft portion 21B has a columnar shape. As illustrated in FIG. 4, there is a protrusion 21*f* provided at the tip end of the second shaft portion 21B. The protrusion 21*f* protrudes in the radial direction.

The coupling shaft 22 is arranged at the position of a second axis X2. The second axis X2 is parallel to the first axis X1 and is separated from the first axis X1. The central axis of the coupling shaft 22 is located on the second axis X2. The coupling shaft 22 protrudes from the first side surface 20*b* of the mirror body 20 along the second axis X2. The coupling shaft 22 has a base end portion 22*a* and a tip end portion 22*b*. The base end portion 22*a* is a base end-side portion of the second shaft portion 21B and is connected to the first side surface 20*b*. The base end portion 22*a* has a columnar shape. The tip end portion 22*b* protrudes from a tip end surface of the base end portion 22*a* along the second axis X2. The tip end portion 22*b* has a flat plate shape having a substantially rectangular cross section. The tip end portion 22*b* has a through hole to which a screw is inserted.

As illustrated in FIG. 5, the holding member 3 has a vertical wall 30, an upper wall 31, a lower wall 32, a locking wall 33, a support portion 34, a hook 36, and a tubular portion 37. The holding member 3 is integrally molded with synthetic resin, for example. The vertical wall 30 is a main body of the holding member 3 and is formed in a flat plate shape. The upper wall 31 and the lower wall 32 are provided so as to be substantially orthogonal to the vertical wall 30. The upper wall 31 and the lower wall 32 face each other. The holding member 3 is fixed to a housing of the vehicle display device 10 so that the upper wall 31 and the lower wall 32 face each other in a vehicle up-down direction, for example.

The upper wall 31 has a motor holder 31*a* that holds the motor 4. The motor holder 31*a* includes a through hole 31*b* penetrating the upper wall 31, and a screw hole 31*c*. The upper wall 31 supports a housing 40 of the motor 4. The output shaft 41 of the motor 4 is inserted into the through hole 31*b*. A screw for fixing the housing 40 to the upper wall 31 is screwed into the screw hole 31*c*. The hook 36 is an arm-shaped portion connected to the upper wall 31. One end of the first spring 8 is hooked on the hook 36 and fixed by the hook 36. A tip end portion of the hook 36 is bent so as to be able to lock the first spring 8.

The lower wall 32 has a support hole 32*a*. The support hole 32*a* may be a recess provided in the lower wall 32 or may be a through hole penetrating the lower wall 32. The support hole 32*a* of the present embodiment penetrates the lower wall 32. The lower wall 32 rotatably supports the rotating member 6 in the support hole 32*a*.

The locking wall 33 protrudes from the vertical wall 30 and extends from the upper wall 31 to the lower wall 32. The locking wall 33 is a component of a stopper mechanism 16 that restricts the rotation range of the worm 5.

The support portion 34 is a portion that supports the first shaft portion 21A of the mirror 2 and is elastically deformable. The support portion 34 has a function as a slide bearing that slidably supports the first shaft portion 21A and a function of aligning the first shaft. portion 21A. The support portion 34 has a cylindrical shape and protrudes from the vertical wall 30 in a direction orthogonal to the vertical wall 30. A tip end 34*b* of the support portion 34 is a free end that is not fixed. The support portion 34 of the present embodiment includes three pieces 35 (35A, 35B, and 35C). As illustrated in FIG. 6 or the like, the pieces 35 are located at equal intervals in a circumferential direction around a central axis C1. There is a slit 34*a* provided between two adjacent pieces 35. That is, the support portion 34 has three pieces 35 separated by the slits 34*a*. Hereinafter, two directions orthogonal to the central axis C1 are referred to as a "second direction Y" and a "third direction Z". The second direction Y and the third direction Z are orthogonal to each other. The second direction Y and the third direction Z are, for example, the horizontal direction and the vertical direction.

There is a tubular portion 37 provided outside the support portion 34. The tubular portion 37 protrudes from the vertical wall 30 and surrounds the support portion 34. The inner circumferential surface of the tubular portion 37 has a circular cross-sectional shape. The tubular portion 37 is arranged coaxially with the support portion 34. The second spring 9 is inserted between the tubular portion 37 and the support portion 34.

As illustrated in FIGS. 5 and 7, the slit 34*a* extends in the axial direction of the support portion 34 from the tip end 34*b* toward a base end 34*c* of the support portion 34. In the present embodiment, the entire portion of the support portion 34 from the tip end 34*b* to the base end 34*c* is divided into three pieces 35. Each of the pieces 35 is connected to the vertical wall 30 at the base end 34*c*, and is individually supported by the vertical wall 30. That is, each of the pieces 35 is formed as a cantilever whose base end 34*c* is a fixed end. The piece 35 has an arcuate cross-sectional shape as illustrated in FIG. 6.

As illustrated in FIG. 7, the support portion 34 has a tapered shape. That is, the support portion 34 has the tip end 34*b* which is smaller in diameter than the base end 34*c*. A radius R1 of the inner circumferential surface of the support portion 34 at the tip end 34*b* is smaller than a radius R2 of the inner circumferential surface of the support portion 34 at the base end 34*c*. That is, the support portion 34 has a tapered shape in which the inner diameter (D1=2×R1) at the tip end 34*b* is smaller than the inner diameter (D2=2×R2) at the base end 34*c*. The inner diameter D1 at the tip end 34*b* is smaller than the outer diameter D3 of the base end portion 21*d* of the mirror 2.

The first shaft portion 21A of the mirror 2 is inserted into the support portion 34 from the base end 34*c*. At this time, the base end portion 21*d* is inserted into the support portion 34 while spreading the support portion 34 outward in the radial direction. In other words, the base end portion 21*d* is inserted into the support portion 34 while flexibly deforming the piece 35 outward in the radial direction.

FIG. 8 illustrates the first shaft portion 21A inserted into the support portion 34. The support portion 34 supports the base end portion 21*d* by the piece 35. Each of the pieces 35 is formed so as to slidably support the base end portion 21*d*. For example, the support portion 34 may support the base end portion 21*d* in a state where a portion on the tip end 34*b* side is in contact with the base end portion 21*d* and a portion on the base end 34*c* side is separated from the base end portion 21*d*. By supporting the first shaft portion 21A by the plurality of pieces 35 evenly arranged in the circumferential direction, the support portion 34 can suppress the displacement of the first shaft portion 21A. The support portion 34 holds the first shaft portion 21A against vibrations in the second direction Y and the third direction Z so as to restrict movement of the first shaft portion 21A in the second direction Y while restricting the movement of the first shaft portion 21A in the third direction Z.

As illustrated in FIG. 9, the bearing member 12 includes a tubular portion 13 and a support portion 14 that is elastically deformable. The support portion 14 has a configuration similar to the support portion 34 of the holding member 3. The tubular portion 13 and the support portion 14 are integrally molded with synthetic resin, for example. The tubular portion 13 has a cylindrical shape. There are protrusion 13a and a fixing portion 13b provided on the outer surface of the tubular portion 13. The bearing member 12 is fixed to the housing of the vehicle display device 10 at the protrusion 13a and the fixing portion 13b.

The support portion 14 is a portion that supports the second shaft portion 21B of the mirror 2. The support portion 14 has a function as a slide bearing that slidably supports the second shaft portion 21B and a function of aligning the second shaft portion 21B. The support portion 14 has a cylindrical shape and is provided coaxially with the tubular portion 13. The support portion 14 has three pieces (15A, 15B, and 15C). The pieces 15 are located inside the tubular portion 13 and are arranged at equal intervals in the circumferential direction. There is a slit 14a provided between two adjacent pieces 15. That is, the support portion 14 has three pieces 15 separated by the slits 14a.

The slit 14a extends in the axial direction of the support portion 14 from the tip end 14b toward a base end 14c of the support portion 14. In the present embodiment, the entire portion of the support portion 14 from the tip end 14b to the base end 14c is divided into three pieces 15. Each of the pieces 15 is connected to the tubular portion 13 at the base end 14c, and is individually supported by the tubular portion 13. The piece 15 has an arcuate cross-sectional shape. The shape of the support portion 14 is a tapered shape, that is, the inner diameter at the tip end 14b is smaller than the inner diameter at the base end 14c.

The second shaft portion 21B of the mirror 2 is inserted into the support portion 14 from the base end 14c. At this time, the second shaft portion 21B is inserted into the support portion 14 while spreading the support portion 14 outward in the radial direction. In other words, the second shaft portion 21B is inserted into the support portion 14 while flexibly deforming the piece 15 outward in the radial direction.

FIG. 10 illustrates the second shaft portion 21B inserted in the support portion 14. The support portion 14 supports the second shaft portion 21B by the three pieces 15. Each of the pieces 15 is formed so as to slidably support the second shaft portion 21B. For example, the support portion 14 may support the second shaft portion 21B in a state where a portion on the tip end 14b side is in contact with the second shaft portion 21B and a portion on the base end 14c side is separated from the second shaft portion 21B.

The motor 4 has a housing 40, an output shaft 41, and a collar 42, as illustrated in FIG. 3. The housing 40 is fixed to the upper wall 31 of the holding member 3. The motor 4 rotates the output shaft 41 by the electric power supplied from a battery or the like of the vehicle 100. The tip end portion of the output shaft 41 is formed in a flat plate shape. The output shaft 41 is inserted into the collar 42 and fitted with the worm 5. The collar 42 rotatably supports the shaft portion of the worm 5.

As illustrated in FIG. 11, the worm 5 has a gear body 50, a connecting shaft 51, a support shaft 52, a sliding portion 53, and a worm-side contact portion 54. The worm 5 is integrally molded with synthetic resin, for example. The gear body 50 has a substantially cylindrical shape. The gear body 50 has helical gear teeth 50a. The connecting shaft 51 is connected to one end of the gear body 50. The support shaft 52 and the sliding portion 53 are connected to the other end of the gear body 50. The connecting shaft 51 and the support shaft 52 are coaxially arranged.

The connecting shaft 51 is a portion connected to the output shaft 41 of the motor 4. As illustrated in FIG. 12, the connecting shaft 51 has a cylindrical shape. The connecting shaft 51 includes a fitting portion 51a. The fitting portion 51a clamps the output shaft 41 of the motor 4 so as to connect the worm 5 and the output shaft 41 in such a way to prohibit their relative rotation.

As illustrated in FIGS. 11 and 13, the sliding portion 53 has a substantially disc shape. The sliding portion 53 has a sliding surface 53a orthogonal to the axial direction. The worm 5 is supported by the rotating member 6 on the sliding surface 53a. The support shaft 52 protrudes from the sliding surface 53a in the axial direction. The support shaft 52 has a substantially columnar shape. The worm-side contact portion 54 is a protrusion protruding from the outer circumferential surface of the sliding portion 53. As illustrated in FIG. 13, the worm-side contact portion 54 of the present embodiment protrudes in the tangential direction from the outer circumferential surface of the sliding portion 53. The worm-side contact portion 54 has contact surfaces 54a and 54b that come in contact with the rotating member 6.

As illustrated in FIGS. 14 and 15, the rotating member 6 includes a main body 60, a support shaft 61, a first contact portion 62, and a second contact portion 63. The rotating member 6 is integrally molded with synthetic resin, for example. The main body 60 has a substantially disc shape. The main body 60 has a first sliding surface 60a and a second sliding surface 60b. The first sliding surface 60a and the second sliding surface 60b face opposite to each other. The first sliding surface 60a is a surface that supports the sliding portion 53 of the worm 5. The sliding surface 53a and the first sliding surface 60a slide, thereby allowing the worm 5 and the rotating member 6 to rotate relative to each other.

The second sliding surface 60b is a surface supported by the lower wall 32 of the holding member 3. The second sliding surface 60b and the lower wall 32 slide, thereby allowing the rotating member 6 to rotate relative to the lower wall 32. The support shaft 61 protrudes from the second sliding surface 60b in the axial direction. The rotating member 6 has a through hole 64 penetrating the main body 60 and the support shaft 61. The through hole 64 is formed coaxially with the central axis of the main body 60 and the support shaft 61. The support shaft 52 of the worm 5 is inserted into the through hole 64.

The first contact portion 62 protrudes from the first sliding surface 60a in the axial direction. The first contact portion 62 is provided on an outer edge of the main body 60, for example. A width W1 of the first contact portion 62 in the circumferential direction may be the size similar to the diameter of the through hole 64.

The second contact portion 63 protrudes from the outer circumferential surface of the main body 60. The direction of protrusion of the second contact portion 63 is the radial direction, for example. A width W2 of the second contact portion 63 in the circumferential direction may be the size similar to the diameter of the through hole 64.

As illustrated in FIG. 3, the coupling member 7 has a main body 70 and a gear unit 71. The gear unit 71 is fixed to a gear mounting portion 73 of the main body 70. As illustrated in FIGS. 16 to 18, the main body 70 includes a base 72, a gear mounting portion 73, and a shaft portion 74. The main body 70 is integrally molded with synthetic resin, for example. The main body 70 is preferably formed of a material having a higher rigidity or higher elastic modulus compared to the material of the mirror 2. The base 72 has a substantially prismatic shape. The base 72 includes a first end 72a and a second end 72b. The first end 72a is one end of the base 72 in the longitudinal direction. The second end 72b is the other end of the base 72 in the longitudinal direction.

The base 72 has a first surface 72c and a second surface 72d. The first surface 72c and the second surface 72d are side surfaces of the base 72. The first surface 72c and the second surface 72d face opposite to each other. The coupling member 7 is coupled to the mirror 2 in a posture in which the first surface 72c faces the mirror 2.

The gear mounting portion 73 is connected to the first end 72a of the base 72. The gear mounting portion 73 has a substantially rectangular parallelepiped shape. The gear mounting portion 73 has a screw hole 73a and a protrusion 73b. The gear unit 71 is positioned by the protrusion 73b. The shaft portion 74 protrudes from the second end 72b of the base 72. More specifically, the shaft portion 74 protrudes from the second surface 72d of the base 72 in a direction orthogonal to the second surface 72d. The shaft portion 74 has a substantially columnar shape. The shaft portion 74 has, on its tip end portion, a groove 74a formed to hold the end of the first spring 8. The groove 74a is formed over the entire outer circumferential surface of the shaft portion 74. The end of the first spring 8 is coupled to the groove 74a.

The base 72 includes a first coupling portion 75, a second coupling portion 76, and a boss 77. The first coupling portion 75 is a through hole formed in the first end 72a of the base 72. The first coupling portion 75 opens on both the first surface 72c and the second surface 72d. The first coupling portion 75 has a cross-sectional shape in which both ends of a rectangle are curved in an arc shape. The first shaft portion 21A of the mirror 2 is inserted into the first coupling portion 75 so as to be coupled to the first coupling portion 75.

The second coupling portion 76 is a recess formed in the second end 72b of the base 72, as illustrated in FIGS. 17 and 18. The second coupling portion 76 is open on the first surface 72c and is recessed toward the second surface 72d. The second coupling portion 76 has a cross-sectional shape in which both ends of a rectangle are curved in an arc shape. The coupling shaft 22 of the mirror 2 is inserted into the second coupling portion 76 so as to be coupled to the second coupling portion 76. The shaft portion 74 is arranged coaxially with the second coupling portion 76, for example.

The boss 77 is a rib protruding from the first surface 72c of the base 72. The bosses 77 are arranged one on each side of the opening of the first coupling portion 75. The boss 77 has an arcuate cross-sectional shape. The two bosses 77 form a substantially cylindrical boss. The boss 77 is inserted into the second spring 9 and holds the second spring 9.

As illustrated in FIG. 19, the gear unit 71 has a base 71a and a plurality of gear teeth 71b. The gear unit 71 is integrally molded with synthetic resin, for example. The base 71a is formed in a rectangular plate shape. The base 71a has a recess 71c corresponding to the protrusion 73b of the main body 70 and a through hole 71d corresponding to the screw hole 73a. The screw for fastening the main body 70 and the gear unit 71 is inserted into the through hole 71d and screwed into the screw hole 73a of the main body 70. The plurality of gear teeth 71b is arranged on one side of the base 71a. The gear teeth 71b are helical gear teeth and mesh with the gear teeth 50a of the worm 5.

The first spring 8 illustrated in FIG. 3 or the like includes a spring body 81, a first ring 82, and a second ring 83. The spring body 81 is an expandable/contractible spring, and an example of this is a coil spring. The first ring 82 is connected to one end of the spring body 81 while the second ring 83 is connected to the other end of the spring body 81. The first ring 82 is hooked on a hook 36 of the holding member 3. The second ring 83 is hooked on the shaft portion 74 of the coupling member 7. The expansion/contraction direction of the first spring 8 is a direction orthogonal to the axial direction of the rotation shaft 21.

The second spring 9 is an expandable/contractible spring, and an example of this is a coil spring. The boss 77 of the coupling member 7 is inserted into one end of the second spring 9. The support portion 34 of the holding member 3 is inserted into the other end of the second spring 9. The second spring 9 is housed between the holding member 3 and the coupling member 7 in a contracted state. Therefore, the second spring 9 applies a biasing force to the coupling member 7 in the axial direction of the rotation shaft 21. The second spring 9 restricts the movement of the coupling member 7 and the mirror 2 in the axial direction, and positions the coupling member 7 and the mirror 2.

FIGS. 20 and 21 illustrate enlarged views of the vicinity of the coupling member 7. As illustrated in FIG. 21, the first shaft portion 21A of the mirror 2 is rotatably supported by the support portion 34 of the holding member 3. Furthermore, the tip end portion 21e of the first shaft portion 21A is inserted into the first coupling portion 75 of the coupling member 7 and coupled to the first coupling portion 75. The second shaft portion 21B of the mirror 2 is inserted into the second coupling portion 76 of the coupling member 7 and coupled to the second coupling portion 76. Therefore, the coupling member 7 rotates together with the mirror 2. The second spring 9 is interposed between the coupling member 7 and the holding member 3 and presses the coupling member 7.

As illustrated in FIG. 20, the gear teeth 71b of the coupling member 7 mesh with the gear teeth 50a of the worm 5. The first ring 82 of the first spring 8 is hooked on the hook 36 of the holding member 3 and is immovably fixed. The second ring 83 of the first spring 8 is hooked on the shaft portion 74 of the coupling member 7.

When the motor 4 rotates the worm 5, a driving force F1 in the axial direction of the worm 5 is applied from the worm 5 to the gear unit 71. The driving force F1 causes the coupling member 7 to pivot about the first axis X1 as a rotation center, as illustrated by arrow Y1. The mirror 2 pivots integrally with the coupling member 7. The driving force F1 is transmitted from the first coupling portion 75 to the first shaft portion 21A while being transmitted from the second coupling portion 76 to the coupling shaft 22.

When the coupling member 7 pivots, the movement of the shaft portion 74 causes the spring body 81 of the first spring 8 to expand and contract. The first spring 8 is hooked on the shaft portion 74 and the hook 36 in an expanded state. In other words, the first spring 8 is held by the coupling member 7 and the holding member 3 so that the spring body 81 is constantly in the expanded state. Therefore, the first spring 8 applies a spring force F2 in the pulling direction to the shaft portion 74. The first spring 8 uses the spring force F2 to reduce the play caused by the backlash between the gear unit 71 and the worm 5. The first spring 8 can suppress the vibration of the mirror 2 and improve the accuracy of rotational position control for the mirror 2.

As described above, in the mirror device 1 of the present embodiment, the first spring 8 is coupled to the coupling member 7. This can suppress the deformation of the mirror 2 as described below. As a comparative example, a configuration in which the second ring 83 of the first spring 8, instead of the coupling member 7, is coupled to the coupling shaft 22 will be examined. In this case, the spring force F2 generates a stress to bend the mirror 2. For example, action of the spring force F2 on the coupling shaft 22 in a state where the first shaft portion 21A is constrained would cause a bending stress to act on the mirror body 20. The mirror device of the comparative example has a possibility of deformation of the mirror 2 due to reduction in the rigidity of the mirror 2 caused by the heat or load applied for a long period of time.

In the mirror device 1 of the present embodiment, the coupling member 7 receives both the driving force F1 and the spring force F2. That is, the coupling member 7 mainly receives the bending moment caused by the driving force F1 and the spring force F2. Therefore, force that deforms the mirror 2 is unlikely to act on the mirror 2. Consequently, the mirror device 1 of the present embodiment can suppress the deformation of the mirror 2.

Furthermore, in the mirror device 1 of the present embodiment, the rotation shaft 21 is rotatably supported by the tubular support portions 34 and 14 as described with reference to FIGS. 8 and 10. The rotation shaft 21 is inserted into the support portions 34 and 14 while spreading the support portions 34 and 14, and is slidably supported by the support portions 34 and 14. The tubular support portions 34 and 14 restrict the movement of the rotation shaft 21 in a direction orthogonal to the axis. Therefore, the mirror device 1 of the present embodiment can suppress the displacement of the rotation shaft 21 and align the rotation shaft 21.

Furthermore, the mirror device 1 of the present embodiment has the stopper mechanism 16 including the rotating member 6. Therefore, as described below, the degree of freedom in controlling the rotation of the mirror 2 can be improved. For example, the mirror device 1 of the present embodiment is capable of increasing the pivot angle of the mirror 2.

Figure 22:
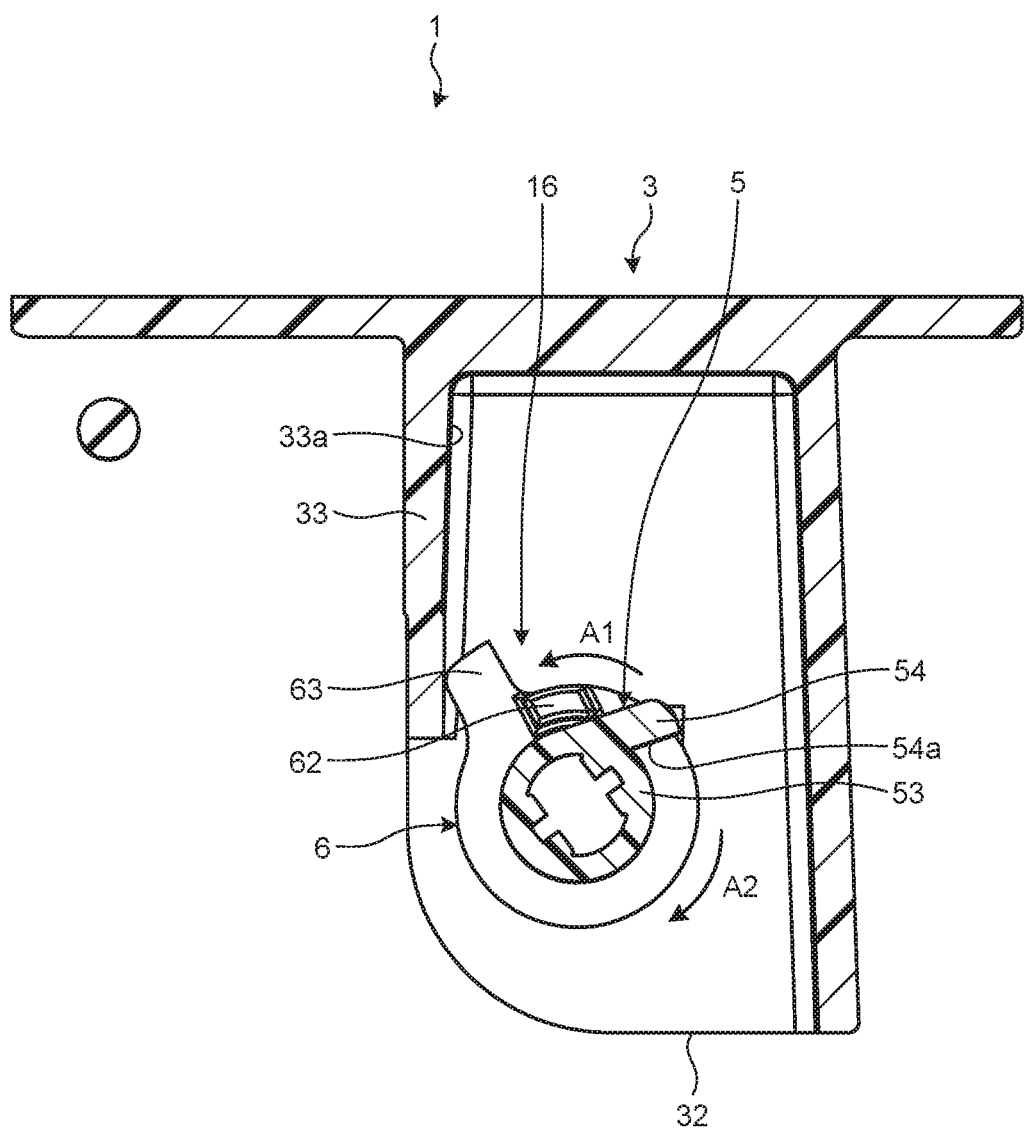
FIG. 22 is a cross-sectional view of a stopper mechanism according to an embodiment.

FIG. 22 illustrates the stopper mechanism 16 in which the worm 5 and the rotating member 6 are in a first stop position. The stopper mechanism 16 includes the worm-side contact portion 54 of the worm 5, the rotating member 6, and the locking wall 33. Rotation of the rotating member 6 and the worm 5 in a first rotation direction A1 is restricted at the first stop position. The first rotation direction A1 is for rotation in a direction of bringing the gear unit 71 of the coupling member 7 closer to the motor 4, for example. The first rotation direction A1 is a rotation direction that increases an inclination angle of the mirror 2, for example. A second rotation direction A2 is a rotation direction opposite to the first rotation direction A1. The second rotation direction A2 is for rotation in a direction of bringing the gear unit 71 of the coupling member 7 away from the motor 4, for example. The second rotation direction A2 is a rotation direction that decreases the inclination angle of the mirror 2, for example.

As illustrated in FIG. 22, the second contact portion 63 of the rotating member 6 is locked by the locking wall 33 of the holding member 3. More specifically, the second contact portion 63 is locked by an inner wall surface 33a of the locking wall 33. The inner wall surface 33a restricts rotation of the rotating member 6 in the first rotation direction A1. In contrast, the rotating member 6 is allowed to rotate in the second rotation direction A2. The worm-side contact portion 54 of the worm 5 is locked by the first contact portion 62 of the rotating member 6. The first contact portion 62 restricts rotation of the worm 5 in the first rotation direction A1. In contrast, the worm 5 is allowed to rotate in the second rotation direction A2.

Figure 23:
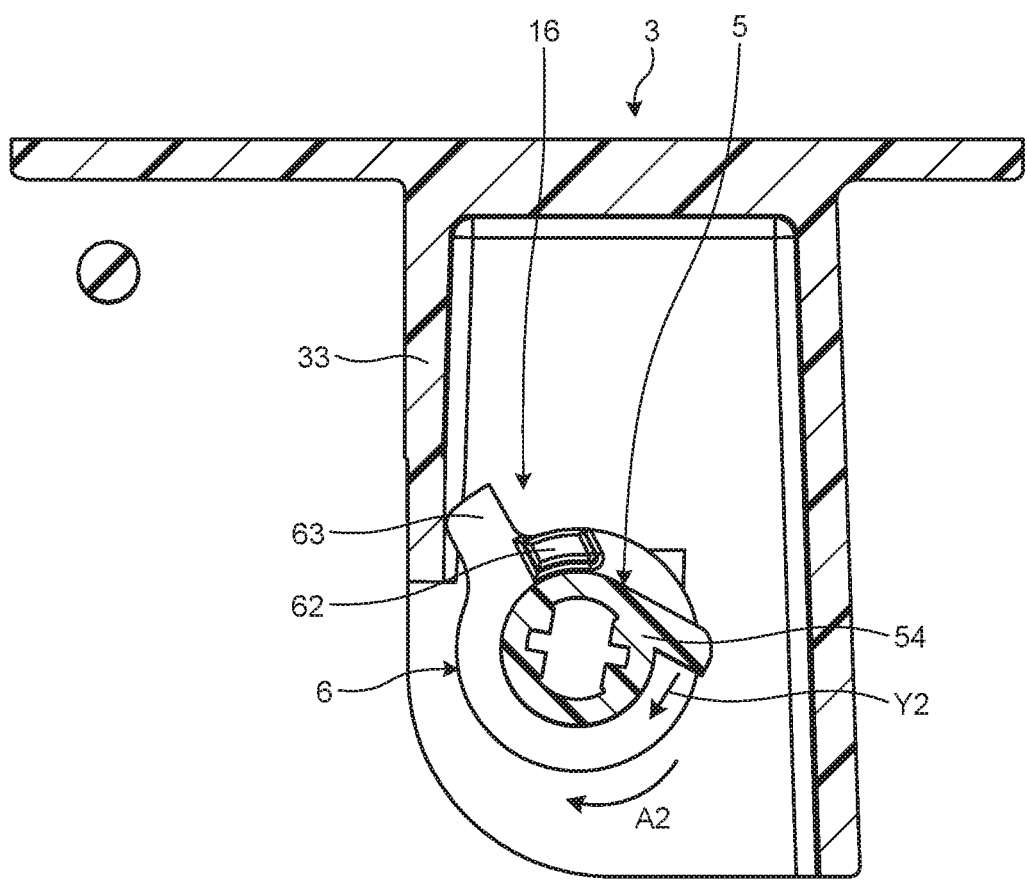
FIG. 23 is a cross-sectional view of a stopper mechanism according to an embodiment.

When the motor 4 applies a rotational force in the second rotation direction A2 to the worm 5 from the state illustrated in FIG. 22, the worm 5 rotates as illustrated. by arrow Y2 in FIG. 23. At this time, the rotating member 6 may remain stopped or may be rotated by the worm 5. Here, the operation when the rotating member 6 is stopped and the worm 5 rotates relative to the rotating member 6 will be described.

Figure 24:
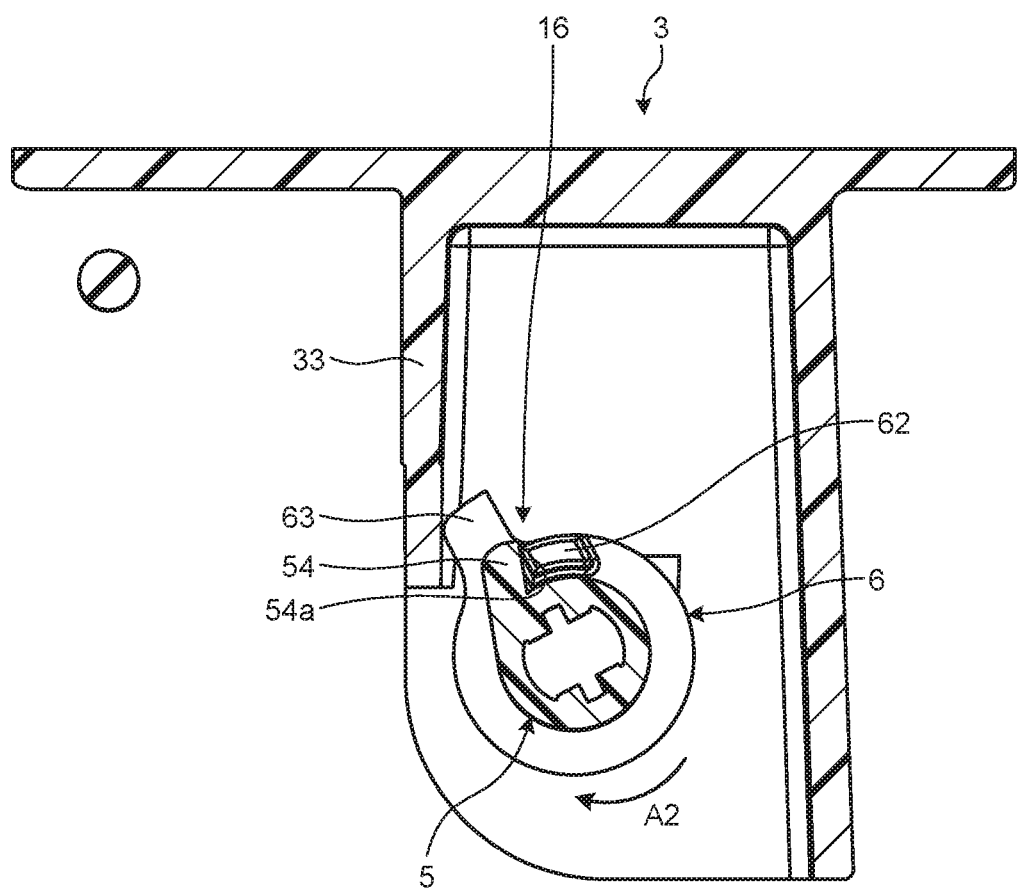
FIG. 24 is a cross-sectional view of a stopper mechanism according to an embodiment.

When the worm 5 rotates relative to the rotating member 6 by a first angle θ1 from the position illustrated in FIG. 22, the worm-side contact portion 54 comes in contact with the first contact portion 62 as illustrated in FIG. 24. The first angle θ1 in the present embodiment is approximately 270°. The first angle θ1 is an angle determined in accordance with the width W1 of the first contact portion 62, the shape of the worm-side contact portion 54, or the like. The first contact portion 62 and the worm-side contact portion 54 of the present embodiment are configured to enable the worm 5 to rotate approximately 270° relative to the rotating member 6. The first angle θ1 can be set according to the target value of the pivoting range of the mirror 2 or the like. The first contact portion 62 and the worm-side contact portion 54 are preferably configured to enable the worm 5 to rotate relative to the rotating member 6 by more than half a rotation.

When the worm-side contact portion 54 comes in contact with the first contact portion 62, the rotational force in the second rotation direction A2 output from the motor 4 is transmitted from the worm-side contact portion 54 to the rotating member 6. Therefore, in a case where the worm 5 further rotates in the second rotation direction A2, the rotating member 6 rotates together with the worm 5.

Figure 25:
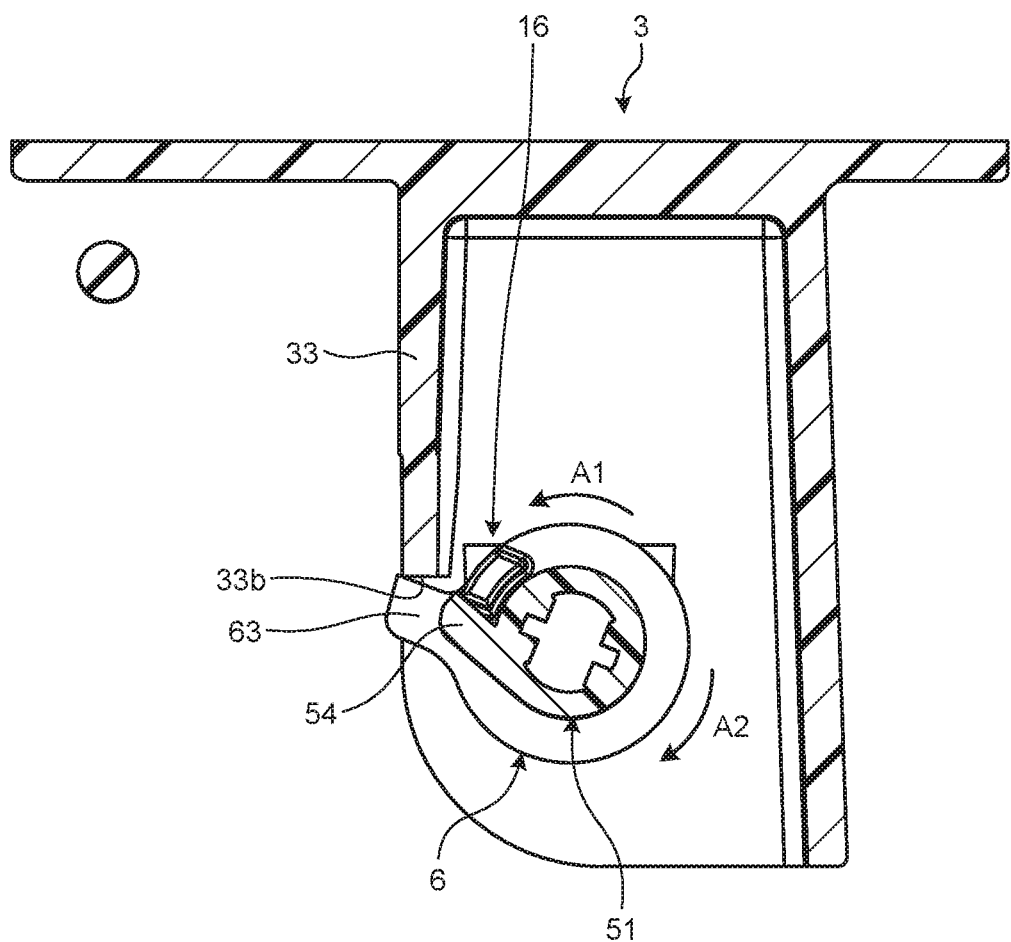
FIG. 25 is a cross-sectional view of a stopper mechanism according to an embodiment.

When the rotating member 6 rotates relative to the lower wall 32 by a second angle θ2 from the position illustrated in FIG. 24, the second contact portion 63 comes in contact with the locking wall 33 as illustrated in FIG. 25. The second contact portion 63 comes in contact with an end surface 33b of the locking wall 33 and is locked by the end surface 33b. The end surface 33b locks the second contact portion 63 to stop the rotation of the rotating member 6 and the worm 5. That is, rotation of the rotating member 6 and the worm 5 in a second rotation direction A2 is restricted at the second stop position.

The second angle θ2 of the present embodiment is approximately 320°. The second angle θ2 is an angle determined according to the width W2 of the second contact portion 63, the shape of the locking wall 33, or the like. The second contact portion 63 and the locking wall 33 of the present embodiment are configured to allow the rotating member 6 to rotate relative to the holding member 3 by approximately 320°. The second angle θ2 can be set according to the target value of the pivoting range of the mirror 2 or the like. The second contact portion 63 and the locking wall 33 are preferably configured to enable the rotating member 6 to rotate relative to the holding member 3 by more than half a rotation.

The position of the worm 5 and the rotating member 6 illustrated in FIG. 25 is referred to as the second stop position. The second stop position is a position where rotation of the worm 5 and the rotating member 6 in the second rotation direction A2 is restricted by the locking wall 33.

In this manner, in the mirror device 1 of the present embodiment, the worm 5 can rotate approximately 590° between the first stop position and the second stop position. That is, the worm 5 can rotate relative to the holding member 3 by more than 1.5 rotations (540°). In this manner, the stopper mechanism 16 of the present embodiment allows the worm 5 to rotate by more than one rotation (360°). As a comparative example, a structure in which the rotating member 6 is not provided and the worm-side contact portion 54 of the worm 5 is locked by the locking wall 33 will be examined. In the comparative example, the worm 5 can rotate only within a range of less than one rotation. In contrast, the rotation range of the worm 5 greatly exceeds one rotation in the mirror device 1 of the embodiment.

According to the mirror device 1 of the present embodiment, the degree of freedom in controlling the rotation of the mirror 2 is improved. For example, the pivoting range of the mirror 2 can be set to a large range. Furthermore, in the mirror device 1 of the embodiment, the reduction ratio or the increasing ratio from the motor 4 to the rotation shaft 21 can be selected from a wide range. Increasing the pivoting range of the mirror 2 also increases the expansion/contraction amount of the first spring 8, which is likely to increase the maximum value of the spring force F2 as a result. Here, the mirror device 1 of the present embodiment has a configuration in which the coupling member 7 receives the spring force F2. Therefore, the mirror 2 is unlikely to be deformed even with the increased spring force F2.

As described above, the mirror device 1 of the present embodiment includes the mirror 2, the cylindrical support portions 14 and 34, and the motor 4 that allows the mirror 2 to pivot. The mirror 2 has the rotation shaft 21 and the reflecting surface 20a that reflects display light. The support portions 14 and 34 have their base ends 14c and 34c fixed while having their tip ends 14b and 34b as free ends, and rotatably support the rotation shaft 21. The rotation shaft 21 is inserted into the support portions 14 and 34 while spreading the support portions 14 and 34 outward in the radial direction, while being slidably supported by the support portions 14 and 34. In the mirror device 1 of the present embodiment, the cylindrical support portions 14 and 34 slidably support the rotation shaft 21 while pressing the rotation shaft 21. Accordingly, the rotation shaft 21 is appropriately held.

As a comparative example with respect to the mirror device 1 of the present embodiment, a configuration in which the rotation shaft 21 is held by a substantially U-shaped shaft holder will be examined. In the comparative example, the rotation shaft 21 might rise toward the opening of the U-shaped shaft holder to cause displacement of the rotation shaft 21. In contrast, the mirror device 1 of the present embodiment has a configuration in which the rotation shaft 21 is inserted into the cylindrical support portions 14 and 34, thereby restricting the displacement of the rotation shaft 21.

The mirror device 1 of the present embodiment further includes the holding member 3. The holding member 3 includes the motor holder 31a that holds the motor 4. The support portion 34 is a part of the holding member 3 and is integrally formed with the motor holder 31a. Such a configuration makes it possible to reduce the number of components.

In the mirror device 1 of the present embodiment, both ends of the rotation shaft 21 are supported by the support portions 14 and 34. Therefore, the displacement and vibration of the rotation shaft 21 are appropriately suppressed.

The shapes of the support portions 14 and 34 in the present embodiment are tapered shapes, that is, the inner diameters at the tip ends 14b and 34b are smaller than the inner diameters at the base ends 14c and 34c, respectively. This makes it possible to reduce the frictional resistance while ensuring the holding force for aligning the rotation shaft 21.

The support portions 14 and 34 of the present embodiment respectively have a plurality of pieces 15 and 35 having an arc-shaped cross section. The plurality of pieces 15 and 35 is respectively separated by slits 14a and 34a extending from the tip ends 14b and 34b of the support portions 14 and 34 toward the base ends 14c and 34c, respectively. It is possible to design the optimum holding force and frictional resistance in accordance with the number and shape of the pieces 15 and 35.

First Modification of Embodiment

Figure 26:
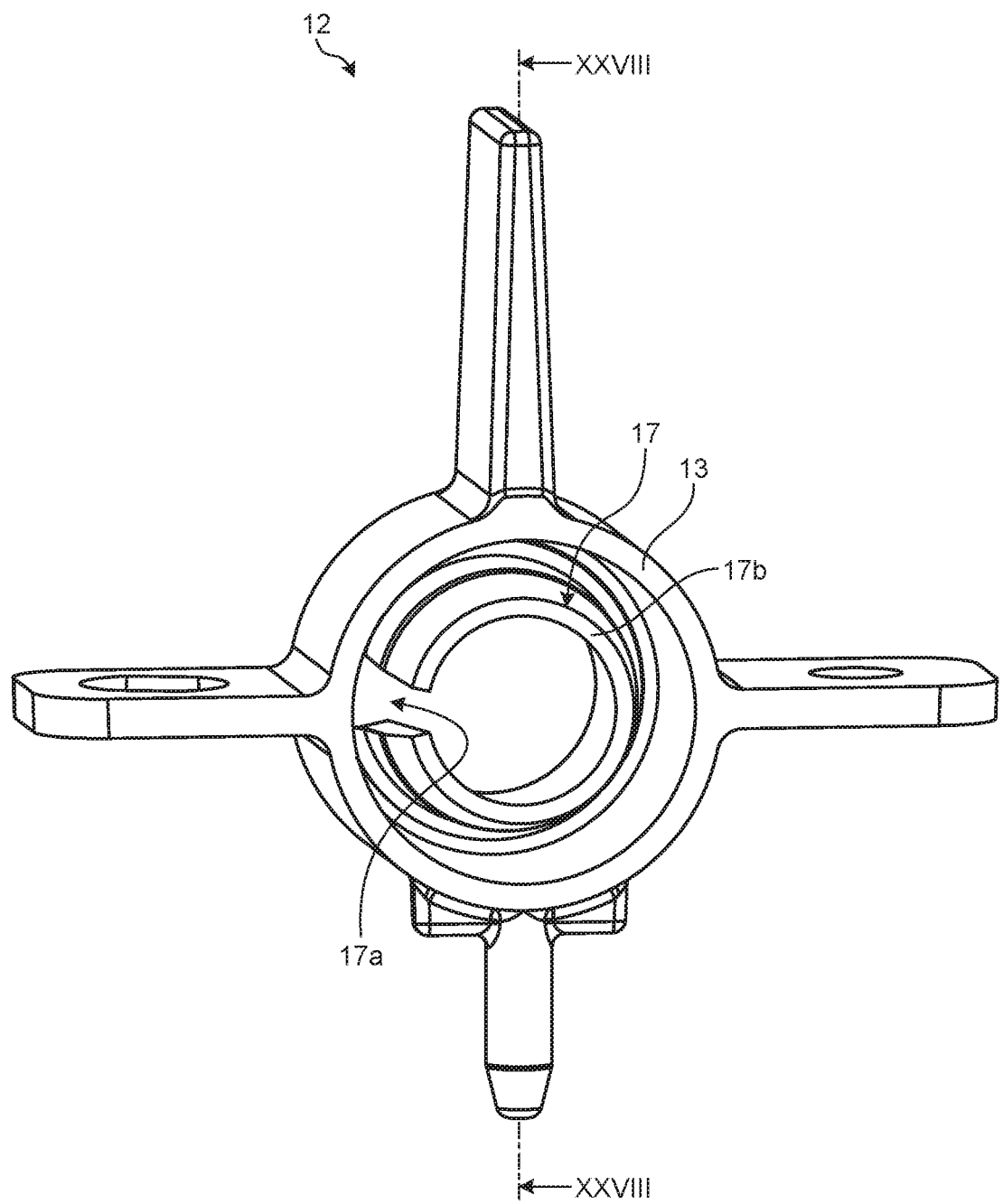
FIG. 26 is a perspective view of a bearing member according to a first modification of an embodiment.
Figure 27:
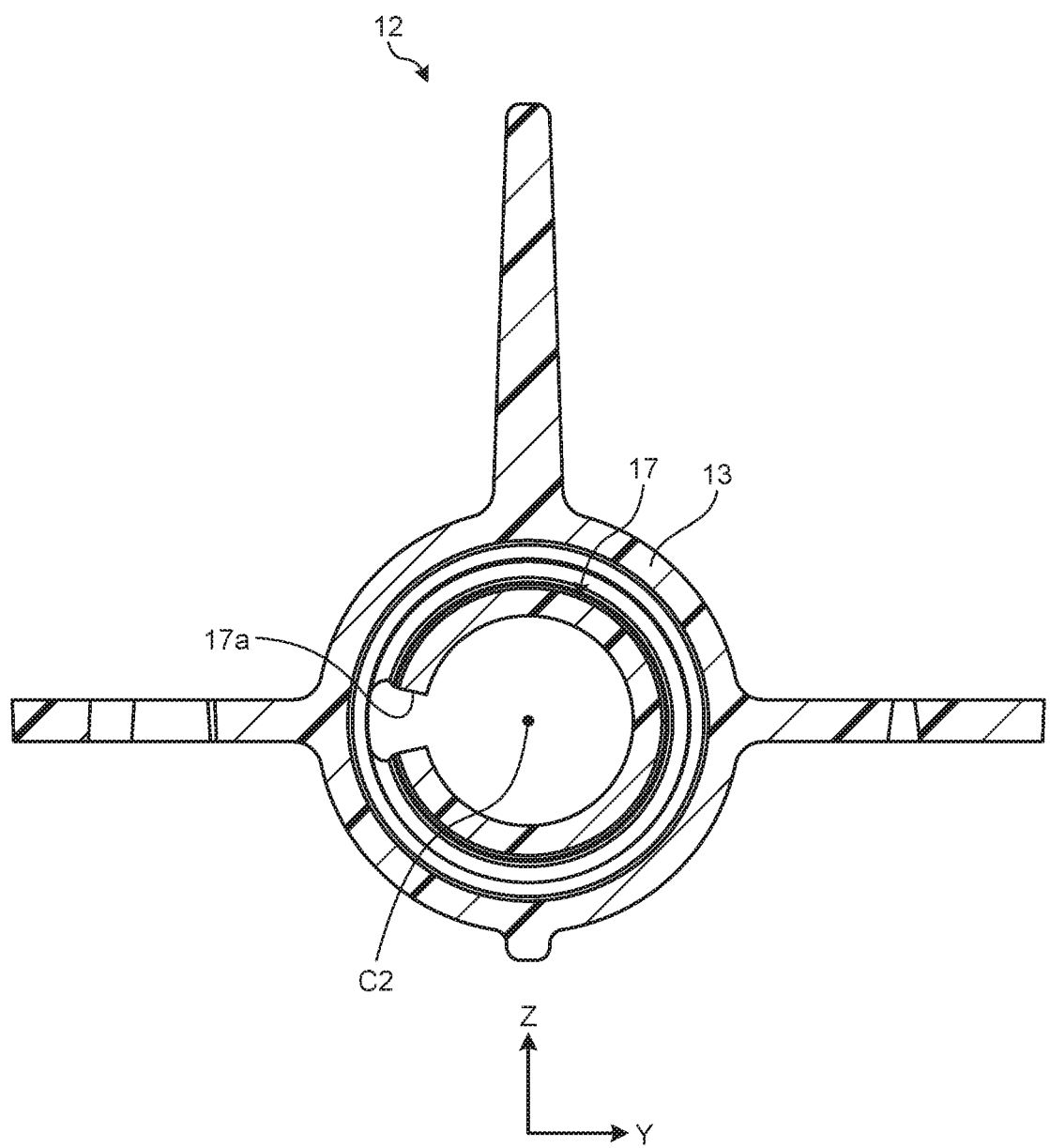
FIG. 27 is a cross-sectional view of the bearing member according to the first modification of an embodiment.
Figure 28:
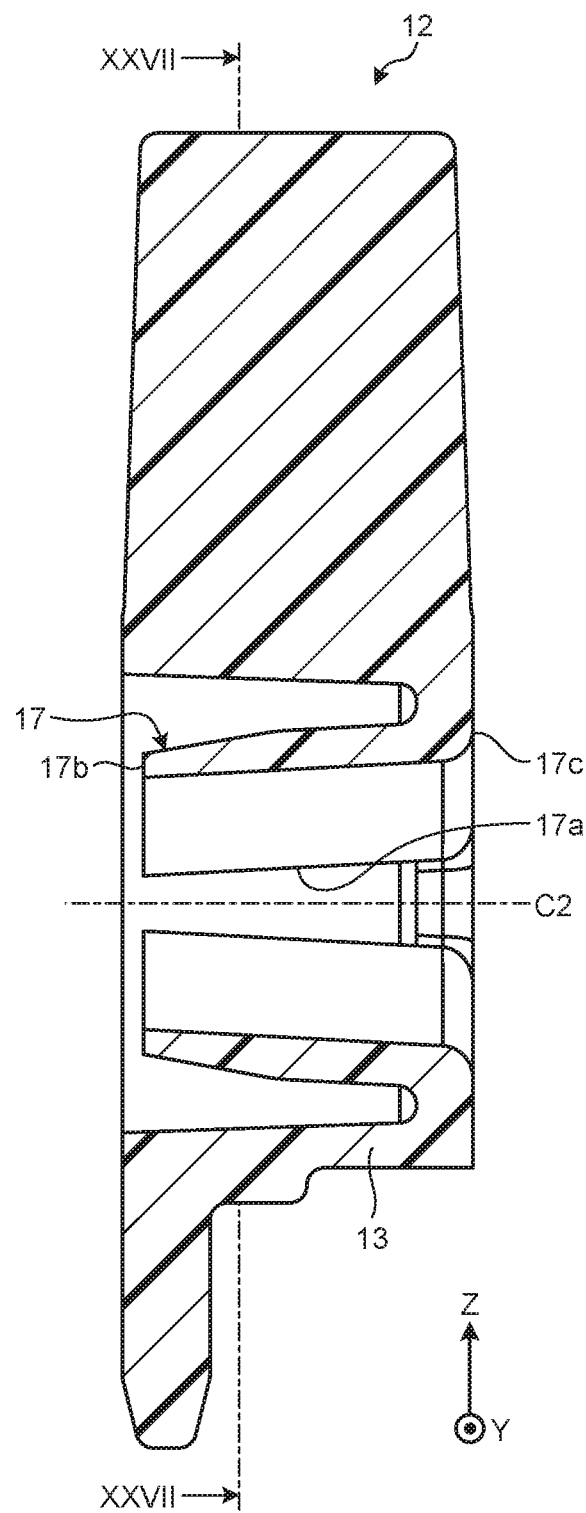
FIG. 28 is a cross-sectional view of the bearing member according to the first modification of an embodiment.

A first modification of an embodiment will be described. FIG. 26 is a perspective view of the bearing member according to the first modification of an embodiment, and FIGS. 27 and 28 are cross-sectional views of the bearing member according to the first modification of the embodiment. The bearing member 12 according to the first modification of the embodiment is different from the bearing member 12 of the above embodiment in the shape of the support portion 17, for example.

As illustrated in FIGS. 26 to 28, the bearing member 12 has a tubular portion 13 and a support portion 17. The shape of the tubular portion 13 is similar to shape of the tubular portion 13 of the above embodiment. The support portion 17 has a cylindrical shape and is provided coaxially with the tubular portion 13. As illustrated in FIG. 27, the support portion 17 has a C-shaped cross-sectional shape. The support portion 17 is provided with one slit 17a. The slit 17a faces the second direction Y. The slit 17a extends in the axial direction of the support portion 17 from a tip end 17b of the support portion 17 toward a base end 17c. In the support portion 17 of the present modification, the slit 17a is provided from the tip end 17b to the base end 17c.

As illustrated in FIG. 28, the width of the slit 17a is wider from the tip end 17b toward the base end 17c. The support portion 17 has a tapered shape in which the inner diameter at the tip end 17b is smaller than the inner diameter at the base end 17c. The second shaft portion 21B of the mirror 2 is inserted into the support portion 17 from the base end 17c. At this time, the second shaft portion 21B is inserted into the support portion 17 while spreading the support portion 17 outward in the radial direction. The support portion 17 is in contact with the outer circumferential surface of the second shaft portion 21B over substantially the entire circumference and slidably supports the second shaft portion 21B. The support portion 17 holds the second shaft portion 21B against vibrations in the second direction Y and the third direction Z so as to restrict the movement of the second shaft portion 21B in the second direction Y while restricting the movement of the second shaft portion 21B in the third direction Z. The support portion 17 may be formed in a tapered cylindrical shape having no slit 17a.

The holding member 3 may have a support portion similar to the support portion 17, instead of the support portion 34 of the above-described embodiment. The support portion of the holding member 3 holds the first shaft portion 21A against vibrations in the second direction Y and the third direction Z so as to restrict movement of the first shaft portion 21A in the second direction Y while restricting the movement of the first shaft portion 21A in the third direction Z.

In a case where the holding member 3 includes the support portion 17 disclosed in the present modification, the mirror device 1 has the following configuration. The mirror device 1 includes:

the mirror 2 having the rotation shaft 21 and the reflecting surface 20a that reflects display light;

the motor 4 that pivots the mirror 2; and the holding member 3 provided with the support portion 17 having a cylindrical shape, having the base end 17c fixed and the tip end 17b being a free end, and configured to rotatably support the rotation shaft 21, and provided with the motor holder 31a that holds the motor 4, the support portion 17 and the motor holder 31a being integrally formed in the holding member 3, in which the rotation shaft 21 is inserted into the support portion 17 while spreading the support portion 17 outward in the radial direction, and is slidably supported by the support portion 17, and the support portion 17 has a C-shaped cross-sectional shape in the cross section orthogonal to the axial direction.

Second Modification of Embodiment

The shape of the support portion is not limited to the shape of the support portions 14 and 34 of the above-described embodiment or the shape of the support portion 17 of the above-described first modification. For example, in a case where the support portions 14 and 34 respectively have a plurality of pieces 15 and 35, the number of pieces 15 and 35 is not limited to the exemplified number. Furthermore, the positions of the slits 14a and 34a are not limited to the exemplified positions.

In the support portion 17 having a C-shaped cross section, the position of the slit 17a is not limited to the exemplified position. For example, the slit 17a may face upward or may face a direction different from both the second direction Y and the third direction Z.

The contents disclosed in the above embodiments and modification can be executed in appropriate combination with each other.

The mirror device according to the present embodiment has a cylindrical support portion that rotatably supports the rotation shaft of the mirror. The rotation shaft is inserted into the support portion while spreading the support portion outward in the radial direction, while being slidably supported by the support portion. According to the mirror device of the present embodiment, the cylindrical support portion slidably supports the rotation shaft while pressing the rotation shaft, enabling the rotation shaft to be appropriately held.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mirror device comprising:
a mirror having a rotation shaft and a reflecting surface that reflects display light;
a support body;
a support portion having a cylindrical shape, having a base end immovably fixed to the support body and a tip end being a free end, and configured to rotatably support the rotation shaft; and
a motor that pivots the mirror, wherein
the rotation shaft is inserted into the support portion while spreading the support portion outward in a radial direction, and is slidably supported by the support portion.

2. The mirror device according to claim 1, further comprising:
a holding member having a motor holder that holds the motor, wherein
the support portion is a part of the holding member and is formed integrally with the motor holder.

3. The mirror device according to claim 1, wherein
both ends of the rotation shaft are supported by the support portion.

4. The mirror device according to claim 2, wherein
both ends of the rotation shaft are supported by the support portion.

5. The mirror device according to claim 1, wherein
the support portion has a tapered shape in which an inner diameter at the tip end is smaller than an inner diameter at the base end.

6. The mirror device according to claim 2, wherein
the support portion has a tapered shape in which an inner diameter at the tip end is smaller than an inner diameter at the base end.

7. The mirror device according to claim 3, wherein
the support portion has a tapered shape in which an inner diameter at the tip end is smaller than an inner diameter at the base end.

8. The mirror device according to claim 1, wherein
the support portion has a C-shaped cross-sectional shape in a cross section orthogonal to an axial direction.

9. The mirror device according to claim 2, wherein
the support portion has a C-shaped cross-sectional shape in a cross section orthogonal to an axial direction.

10. The mirror device according to claim 3, wherein
the support portion has a C-shaped cross-sectional shape in a cross section orthogonal to an axial direction.

11. The mirror device according to claim 5, wherein
the support portion has a C-shaped cross-sectional shape in a cross section orthogonal to an axial direction.

12. The mirror device according to claim 1, wherein
the support portion has a plurality of pieces each having an arc-shaped cross section, and the plurality of pieces is separated from each other by a slit extending from the tip end to the base end of the support portion.

13. The mirror device according to claim 2, wherein
the support portion has a plurality of pieces each having an arc-shaped cross section, and the plurality of pieces is separated from each other by a slit extending from the tip end to the base end of the support portion.

14. The mirror device according to claim 3, wherein
the support portion has a plurality of pieces each having an arc-shaped cross section, and the plurality of pieces is separated from each other by a slit extending from the tip end to the base end of the support portion.

15. The mirror device according to claim 5, wherein
the support portion has a plurality of pieces each having an arc-shaped cross section, and the plurality of pieces is separated from each other by a slit extending from the tip end to the base end of the support portion.

16. The mirror device according to claim 1, wherein
the support body is a vertical wall.

17. The mirror device according to claim 1, wherein
the support body is a tubular portion.

18. A mirror device comprising:
a mirror having a rotation shaft and a reflecting surface that reflects display light;
a motor that pivots the mirror; and
a holding member provided with a support portion having a cylindrical shape, having a base end fixed and a tip end being a free end, and configured to rotatably support the rotation shaft, and provided with a motor holder that holds the motor, the support portion and the motor holder being integrally formed in the holding member, wherein the rotation shaft is inserted into the support portion while spreading the support portion outward in a radial direction, and is slidably supported by the support portion, and the support portion has a C-shaped cross-sectional shape in a cross section orthogonal to an axial direction.

* * * * *